(12) United States Patent
Smith

(10) Patent No.: US 11,883,892 B2
(45) Date of Patent: Jan. 30, 2024

(54) STOP FOR A WORK PLATFORM TOOL

(71) Applicant: JessEm Products Limited, Orillia (CA)

(72) Inventor: Darrin E. Smith, Innisfil (CA)

(73) Assignee: Jessem Tool Corporation

( * ) Notice: Subject to any disclaimer, the term of this patent is extended or adjusted under 35 U.S.C. 154(b) by 0 days.

(21) Appl. No.: 17/023,494

(22) Filed: Sep. 17, 2020

(65) Prior Publication Data

US 2021/0001420 A1    Jan. 7, 2021

Related U.S. Application Data

(62) Division of application No. 16/370,601, filed on Mar. 29, 2019, now Pat. No. 11,084,110.

(51) Int. Cl.
| | | |
|---|---|---|
| *B23D 47/04* | (2006.01) | |
| *B27B 25/10* | (2006.01) | |
| *B27B 27/02* | (2006.01) | |

(52) U.S. Cl.
CPC ............ *B23D 47/045* (2013.01); *B27B 25/10* (2013.01); *B27B 27/02* (2013.01)

(58) Field of Classification Search
CPC ...... B23D 33/10; B23D 47/045; B23D 47/04; B23D 47/042; B23D 47/047; B27B 25/10; B27B 27/02; B27B 27/00–10; B27G 5/023; Y10T 83/7593
USPC .................. 83/468.2, 468.4, 468.5, 468.6
See application file for complete search history.

(56) References Cited

U.S. PATENT DOCUMENTS

| | | | |
|---|---|---|---|
| 2,396,005 A |   | 3/1946 | Gross et al. |
| 2,787,301 A | * | 4/1957 | Anderson ............... B27B 25/10 83/435.14 |
| 3,827,686 A | * | 8/1974 | Storkh ................. B23Q 16/001 269/315 |
| 4,256,000 A | * | 3/1981 | Seidel ..................... B27B 27/02 83/468 |
| 4,432,263 A |   | 2/1984 | Kowalchuk |
| 4,464,962 A | * | 8/1984 | Myhre .................... B27B 25/10 83/477.2 |
| 5,018,562 A | * | 5/1991 | Adams .................... B27B 27/10 83/435.15 |
| 5,038,486 A | * | 8/1991 | Ducate, Sr. ............. B27B 29/00 83/435.14 |

(Continued)

OTHER PUBLICATIONS

Office Action dated Jan. 22, 2021 U.S. Appl. No. 16/370,601, 12 pages.
Office Action dated Oct. 5, 2020 U.S. Appl. No. 16/370,601, 12 pages.

*Primary Examiner* — Adam J Eiseman
*Assistant Examiner* — Richard D Crosby, Jr.
(74) *Attorney, Agent, or Firm* — Stinson LLP

(57) ABSTRACT

A stop for a tool that engages a work piece on a work platform includes a mounting assembly that can be movably mounted on the tool so that the mounting assembly is selectively positionable on the tool. A first member is operatively connected to the mounting assembly and projects outwardly from the mounting assembly. A second member projects from the first member to engage and locate the work piece with respect to the tool. The second member is mounted on the first member for movement along a length of the first member and is selectively fixed to the first member to adjust a distance between the second member and the mounting assembly.

26 Claims, 20 Drawing Sheets

(56) References Cited

U.S. PATENT DOCUMENTS

| | | | |
|---|---|---|---|
| 5,275,074 A | 1/1994 | Taylor et al. | |
| 5,617,909 A * | 4/1997 | Duginske | B27B 25/10 144/253.1 |
| 5,662,019 A * | 9/1997 | Denman | B27C 1/12 83/438 |
| 5,735,054 A | 4/1998 | Cole | |
| 5,768,966 A * | 6/1998 | Duginske | B27B 25/10 144/253.1 |
| 5,890,524 A * | 4/1999 | Tucker | B27B 25/10 33/197 |
| 5,895,184 A * | 4/1999 | Walters | B23Q 16/001 33/642 |
| 5,979,283 A * | 11/1999 | Osborne | B27B 25/10 33/459 |
| 6,237,457 B1 | 5/2001 | Taylor | |
| 6,557,601 B1 * | 5/2003 | Taylor | B27B 27/02 144/253.1 |
| 7,127,976 B1 * | 10/2006 | Fitzsimmons | B23D 55/046 83/437.1 |
| 7,798,187 B1 * | 9/2010 | Duginske | B27B 27/10 144/253.1 |
| 8,100,600 B2 | 1/2012 | Blum | |
| 8,282,088 B2 | 10/2012 | Janson et al. | |
| 9,682,454 B2 * | 6/2017 | Suhling | B23Q 16/028 |
| 10,046,428 B2 | 8/2018 | Phillips | |
| 10,759,083 B1 * | 9/2020 | Chang | B27B 27/10 |
| 2001/0047706 A1 | 12/2001 | Parks et al. | |
| 2003/0056631 A1 * | 3/2003 | Duginske | B27B 27/10 83/468.7 |
| 2006/0201298 A1 | 9/2006 | Smith | |
| 2007/0084323 A1 | 4/2007 | Parks | |
| 2018/0036905 A1 | 2/2018 | Frolov | |

* cited by examiner

STOP FOR A WORK PLATFORM TOOL

CROSS-REFERENCE TO RELATED APPLICATION

This application claims priority to and is a divisional of U.S. patent application Ser. No. 16/370,601, filed Mar. 29, 2019, the entirety of which is hereby incorporated by reference.

FIELD

The present disclosure generally relates to a guide assembly for guiding a work piece on a work table and more specifically to a miter gauge assembly.

BACKGROUND

Miter gauge assemblies are used to guide movement of stock along a work table, such as a router table or table saw, in a feed direction. Miter gauges typically include a bar that is slidably received in a channel of the work table to guide movement of the miter gauge assembly in a straight or linear manner along the work table. Miter gauge assemblies are typically equipped with a fence coupled to the miter gauge, whose orientation (e.g., angle) and location can be adjusted relative to the cutting element (e.g., blade) of the work table. The fences typically define slots for slidably mounting the fence to the miter gauge. This allows the fence to slide relative to the miter gauge to change the location or distance of the fence relative to the cutting element. One or more of these slots can also slidably mount other various implements and accessories to the miter gauge assembly. For example, a fence extender can be slidably mounted in a race to change the operative length of the fence.

SUMMARY

In one aspect, a guide assembly for use with a tool to guide movement of the tool along a channel defined by a work platform includes an elongate bar configured to be slidably received in the channel. The elongate bar defines a longitudinal axis extending between opposite first and second ends of the elongate bar and has a width extending between opposite first and second sides of the elongate bar. The width of the elongate bar is less than a width of the channel. The elongate bar defines recesses extending from the first side of the elongate bar toward the second side of the elongate bar. Guides are moveably mounted on the elongate bar to adjust a working width of the guide assembly to fit the width of the channel defined by the work platform. Each guide is moveably mounted in one of the recesses of the elongate bar. Each guide projects from the corresponding recess and has a guide surface having at least a portion thereof disposed outward of the first side of the elongate bar. The working width of the guide assembly extends between the second side of the elongate bar and the portion of the guide surface disposed outward of the first side of the elongate bar. The guide assembly also includes two or more deformable members. Each deformable member is operatively connected between each guide and the elongate bar so that movement of each guide relative to the elongate bar results in deformation of the deformable member.

In another aspect, a miter gauge for guiding a work piece over a work platform includes a base assembly configured to engage and slide over the work platform. A fence is configured to engage the work piece on the work platform. The fence defines a longitudinal axis extending between opposite ends of the fence. The fence and base assembly are connected to one another for relative movement such that the fence is selectively positionable longitudinally along the base assembly to adjust a longitudinal position of the fence with respect to the base assembly. The fence includes a first locating member. A second locating member is operatively connected to the base assembly and is configured to selectively engage the first locating member of the fence. The first and second locating members are aligned along the longitudinal axis of the fence. The second locating member is moveable between a locked position where the second locating member is engaged with the first locating member to inhibit longitudinal movement of the fence with respect to the base assembly and hold the fence at a preset longitudinal position with respect to the base assembly and an unlocked position where the second locating member disengages the first locating member such that the base assembly is free to move to other longitudinal positions along the fence.

In still another aspect, a stop for a tool that engages a work piece on a work platform includes a mounting assembly configured to be movably mounted on the tool so that the mounting assembly is selectively positionable on the tool. A first member is operatively connected to the mounting assembly and projects outwardly from the mounting assembly. A second member projects from the first member and is configured to engage the work piece to locate the work piece with respect to the tool. The second member is mounted on the first member for movement along a length of the first member and is selectively fixed to the first member to adjust a distance between the second member and the mounting assembly.

In yet another aspect, a miter gauge for guiding a work piece over a work platform in relation to a blade. The work platform has a work surface, a first axis perpendicular to the blade and parallel to the work surface and a second axis extending from and normal to the work surface. The miter gauge includes a base assembly configured to engage and slide over the work platform. The base assembly includes a base configured to be operatively coupled to the work platform. A fence plate is operatively coupled to the base and is moveable relative to the base to adjust the position of the fence plate relative to the base. The fence plate has a fence engaging face. Brackets operatively connect the fence plate to the base. Each bracket is connected to the fence plate and the base. Each bracket is movable relative to the base to adjust the orientation of the fence plate relative to the first axis in order to square the fence engaging face to the blade. The fence plate is movable relative to the two brackets to adjust the orientation of the fence plate relative to the second axis in order to square the fence engaging face to the work surface.

In another aspect, a fence stop for a fence that engages a work piece includes a sliding member configured to engage a work piece to prevent the work piece from moving relative to the fence. The sliding member has opposite first and second ends and defines a longitudinal axis extending between the first and second ends. The sliding member defines a slot generally parallel to the longitudinal axis. A fastener is receivable through the slot to connect the sliding member to the fence. An O-ring is mounted on the fastener. The sliding member defines a groove in communication with the slot that receives the O-ring mounted on the fastener to prevent the sliding member from moving relative to the fence.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
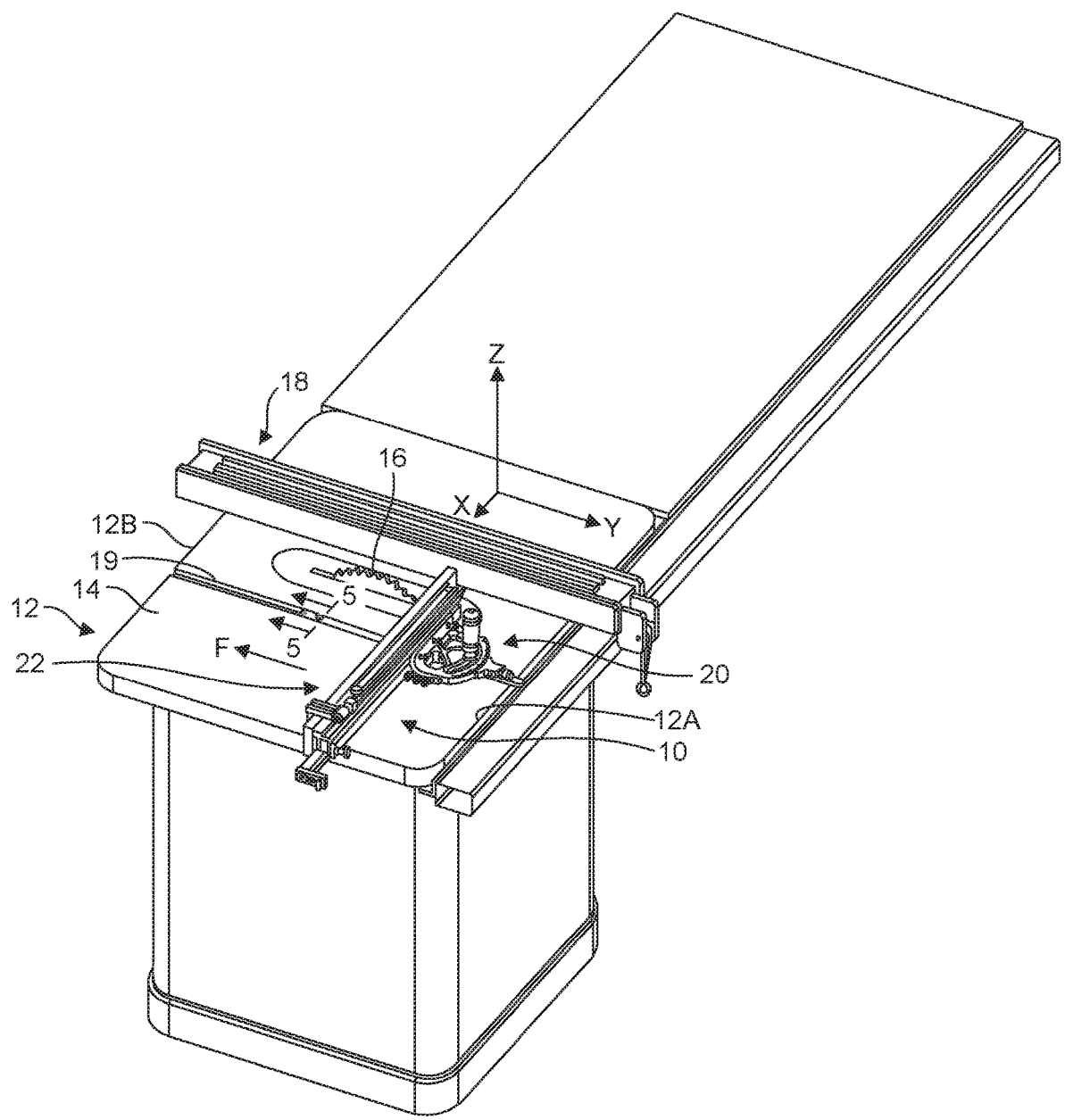
FIG. 1 is a perspective of a miter gauge assembly mounted on a work surface of a table saw.
Figure 2:
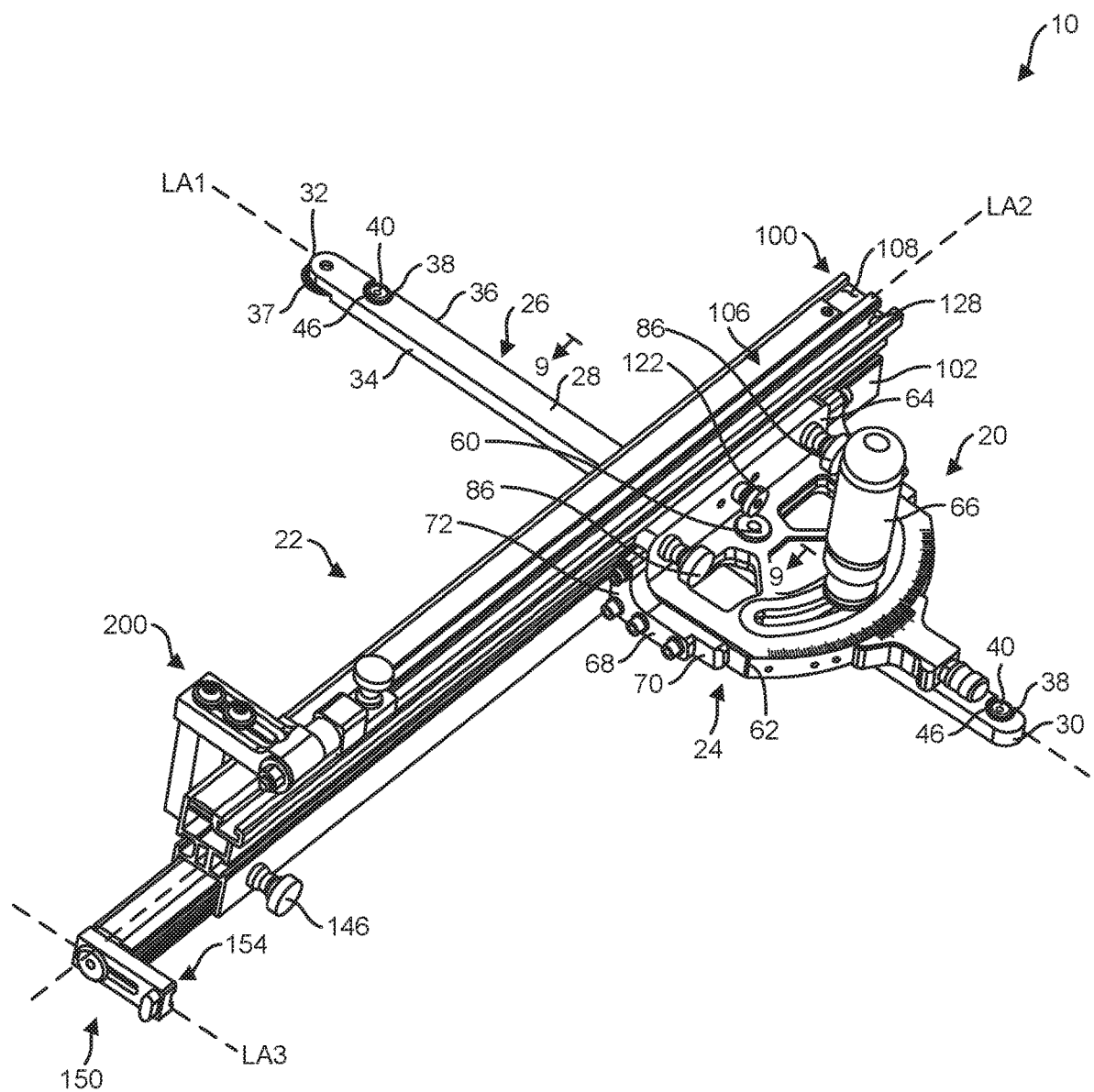
FIG. 2 is a perspective of the miter gauge assembly.

Referring to FIGS. 1 and 2, a miter gauge assembly for guiding movement of stock (e.g., work piece) along a work table 12 in a feed direction F is generally indicated at reference number 10. In the illustrated embodiment, the work table 12 is a table saw, but features of the miter gauge assembly 10 are independent of the kind of work table and can be used in combination with other kinds of work tables (e.g., router tables, etc.) without departing from the scope of the present disclosure. The work table 12 defines a horizontal work surface 14 (broadly, work platform) and has an infeed end 12A and an opposite outfeed end 12B spaced apart from one another in the feed direction F. The work table 12 includes a table fence 18 extending across the work surface 14 in the feed direction F. The work table 12 includes a blade 16 (broadly, a cutting element or working element) that projects upward from the work surface 14 to work or cut the stock as the stock is guided along the work surface by the miter gauge assembly 10, as generally understood in the art. The illustrated miter gauge assembly 10 includes both a miter gauge, generally indicated at 20, and a fence assembly, generally indicated at 22, moveably connected to the miter gauge.

For the purposes of illustration, the work surface 14 of the work table 12 contains a horizontal line or x-axis and an intersecting horizontal line or y-axis perpendicular to the x-axis. The feed direction F is generally parallel to the y-axis. The x-axis is generally perpendicular to or square with the blade 16. A vertical line or z-axis normal to the xy-plane or work surface 14, passes through the coordinate origin formed by the intersecting x- and y-axes.

Referring to FIGS. 2-6, the miter gauge 20 includes a base assembly, generally indicated at 24, pivotally attached to a guide assembly, generally indicated at 26. The guide assembly 26 is configured to guide movement of the miter gauge assembly 10 across the work surface 14 in the feed direction F. The guide assembly 26 includes an elongate bar 28 configured to be slidably received in a channel 19 (e.g., groove) defined by the work surface 14. As shown in FIG. 1, the channel 19 extends in the feed direction F across the work surface 14 from the infeed end 12A to the outfeed end 12B of the work table 12. Thus, the channel 19 is generally parallel to the y-axis and the blade 16. The channel 19 has a width W2 (FIG. 5) that is generally perpendicular to the feed direction F. The bar 28 has opposite ends 30 and 32, respectively, and defines a longitudinal axis LA1 extending between the opposite ends. The bar 28 has opposite sides 34 and 36, respectively, and a width W1 extending between the opposite sides. The width W1 of the bar 28 is less than the width W2 of the channel 19. This allows the bar 28 to be inserted and received in the channel 19. In one embodiment, the channel 19 has a width W2 of 0.75 inches (1.9 cm) and the bar 28 has a width of 0.73 inches (1.85 cm), although other dimensions are within the scope of the present disclosure. In the illustrated embodiment, the channel 19 is an inverted T-shaped channel (FIG. 5) and the guide assembly 26 includes a wheel 37 rotatably connected to one end 32 of the bar that extends into the side recesses of the T-shaped channel to inhibit the guide assembly from lifting out of the channel.

The bar 28 defines recesses 38 longitudinally spaced apart along the bar. In the illustrated embodiment, the bar 28 defines three recesses 38, although more or fewer recesses are within the scope of the present disclosure. Each recess 38 extends from one side 36 of the bar toward the other side 34 of the bar. The recesses 38 extend from one side 36 to the other side 34 in a direction that is generally perpendicular to the longitudinal axis LA1 of the bar. In the illustrated embodiment, the recesses 38 do not extend all the way from one side 36 to the other side 34. In other embodiments, the recesses may extend from one side to the other (e.g., across the entire width of the bar). Each recess 38 includes an open top at the upper surface of the bar 28 and an open side at one side 36 of the bar.

Each recess 38 is sized and shaped to receive a guide 40. Each guide 40 is moveably mounted on the bar 28 in order to adjust the working width WW of the guide assembly 26 to fit the width W2 of the channel 19. Each guide 40 is selectively moveable within its respective recess 38 in a direction generally perpendicular to the longitudinal axis LA1 in order to adjust the working width WW of the guide assembly 26. In the illustrated embodiment, the guides 40 are collars, although other configurations are within the scope of the present disclosure. Each collar 40 has a guide surface 54 (broadly, outer perimeter surface) having at least a portion thereof disposed outward of one side 36 of the bar 28. In other words, at least a portion of each collar 40 projects outward from its corresponding recess 38 in a direction generally perpendicular to the longitudinal axis LA1 through the open side of the recess 38 and past the side 36 of the bar 28. The working width WW of the guide assembly 26 extends between the side 34 of the bar 28 and the portion of the guide surface 54 disposed outward of the side 36 of the elongate bar. Specifically, the working width WW is measured to the outward most point on the guide surface 54. As explained in more detail below, the collar 40 can be moved within the recess 38 in order to adjust the working width WW of the guide assembly 26 to fit the particular size of the channel 19 of the work table 12. Each collar has a generally circular cross-sectional shape (taken parallel to the xy plane when the miter gauge 20 is mounted on the work table 12).

Figure 4:
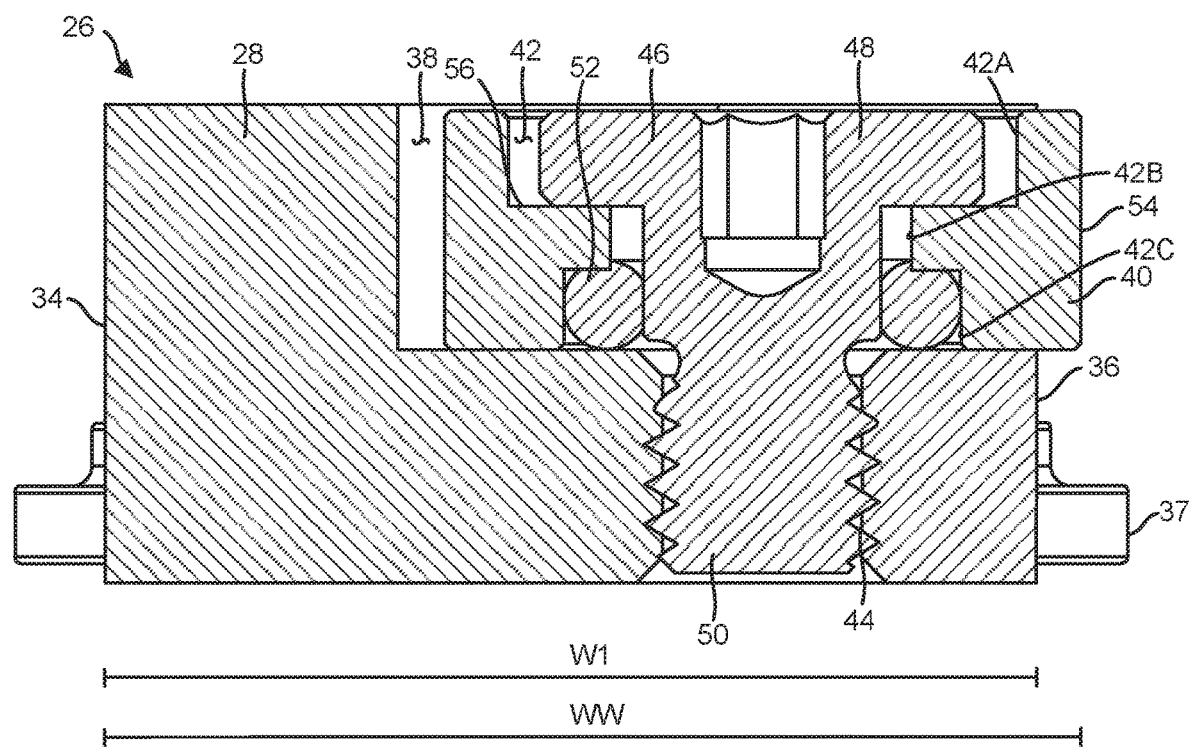
FIG. 4 is a cross section taken through line 4-4 of FIG. 3.
Figure 5:
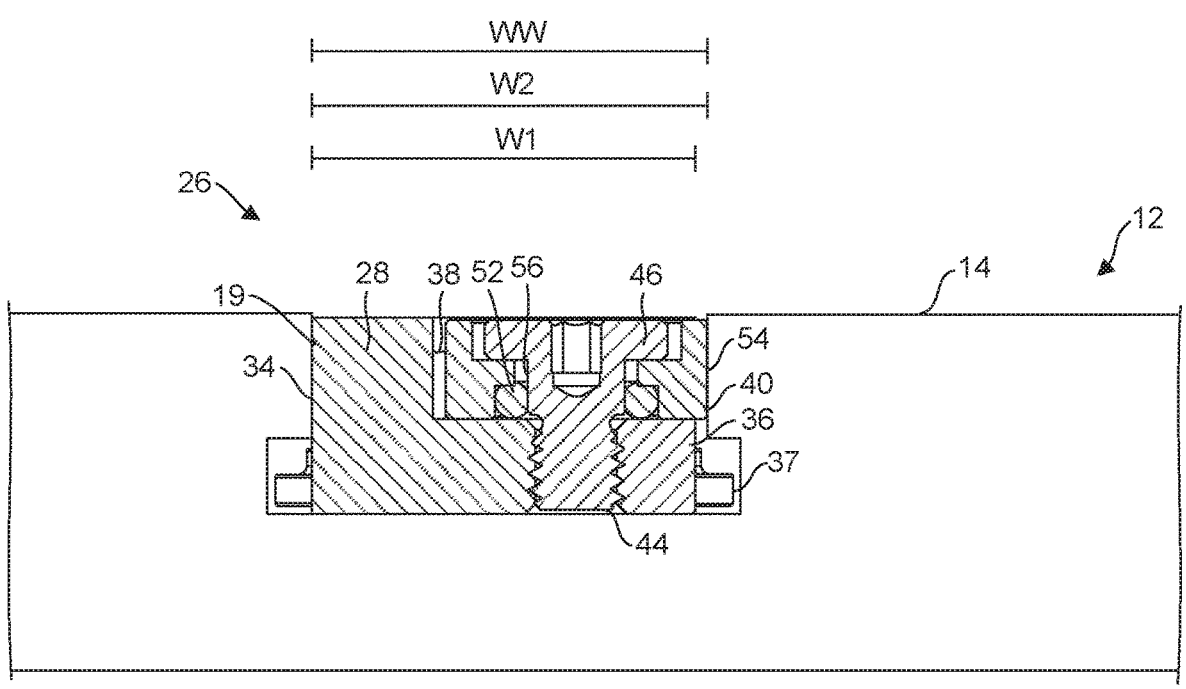
FIG. 5 is a fragmentary cross section taken through line 5-5 of FIG. 1.

The guide assembly 26 includes deformable members 52. Each deformable member 52 is operatively connected between one of the collars 40 and the bar 28 so that movement of each collar relative to the bar results in deformation of the deformable member. As will be explained in more detail below, each deformable member 52 facilitates the adjustment of the working width WW. In the illustrated embodiment, the deformable member 52 is an O-ring, although other configurations are within the scope of the present disclosure. Each collar 40 defines an opening 42 that receives a fastener 46 (e.g., screw) to movably mount the collar to the bar 28. The fit of the screw 46 in the opening 42 is loose, so that the collar 40 can move somewhat laterally of the screw and bar 28. The bar defines a threaded hole 44 below each recess 38 which threadably receives the screw 46 to secure the collar 40 in the recess. As shown in FIGS. 4 and 5, the O-ring 52 is positioned on the shaft 50 of the screw 46, between at least a portion of the screw 46 and at least a portion of collar 40. As a result, lateral movement of the collar 40 in the recess 38 and relative to the screw 46 compresses (broadly, deforms) the O-ring 52 between the screw and the collar.

Each collar 40 is movable in its recess 38 relative to the screw 46 and, thus, the bar 28. Specifically, each collar 40 is slidable within the recess 38 in a direction that is generally perpendicular to the longitudinal axis LA1 and parallel to the width of the bar 28. The opening 42 in each collar 40 includes an upper section 42A configured to receive the head 48 of the fastener, an intermediate section 42B configured to receive a portion of the shaft 50 of the fastener, and a lower section 42C configured to receive another portion of the shaft and the deformable member 52. The upper, intermediate and lower sections 42A-C all have different diameters with the intermediate section having the smallest diameter. However, the diameter of the intermediate section 42B is larger than the diameter of the shaft 50 of the fastener in order to allow the collar 40 to move relative to the fastener in a direction generally perpendicular to the longitudinal axis LA1 and parallel to the width of the bar 28. In one embodiment, the diameter of the intermediate section 42B is 0.04 inches (1 mm) larger than the diameter of the shaft 50 to allow the collar 40 to move a maximum of 0.04 inches (1 mm) relative to the screw 46.

When the screw 46 is rotatably tightened against the collar 40, the fastener secures and fixes the lateral position of the collar within the recess 38. When tightened, the head 48 of the screw 46 engages a shoulder 56 of the collar 40 defining the upper section 42A and clamps the collar against the bottom of the recess 38 to prevent the collar from moving. Thus, when secured by the screw 46, the collar 40 does not move or rotate relative to the fastener. When the O-ring 52 is in its initial undeformed or uncompressed state (as shown in FIG. 4), the guide assembly 26 preferably has a working width WW greater than the width W2 of the channel 19. In this arrangement, the collar 40 and screw 46 are generally aligned with one another. In one embodiment, the guide assembly has an initial or unadjusted working width WW of 0.765 inches (1.94 cm) when the O-rings 52 are in the undeformed state. It is understood that in the initial undeformed or uncompressed state, the deformable member 52 may be slightly compressed or deformed in order to fill the lower section 42C between the collar 40 and the screw 46 (FIG. 4).

To adjust (e.g., reduce) the working width WW of the guide assembly 26 to fit the width W2 of the channel 19, each screw 46 is loosened to reduce or remove its frictional grip and the clamping force of the corresponding collars 40. This allows each collar 40 to freely move in a direction generally perpendicular to the longitudinal axis LA1. The guide assembly 26 is then inserted into the channel 19 and, as a result of the engagement between the portion of the guide surface 54 disposed outward of the bar 28 and the side of the channel, each collar 40 moves in a direction generally perpendicular to the longitudinal axis LA1. In particular, each collar 40 moves toward the side 34 of the bar 28. In one embodiment, a spacer (not shown), such as a piece of paper, may be positioned between the collar 40 and the side of the channel 19 to provide a small degree of clearance, approximately 0.003 inches (0.08 mm), between the collar and the side of the channel to allow the guide assembly to move within the channel.

As each collar 40 moves, each collar compresses the deformable member 52 (broadly, at least a portion thereof) against the screw 46 (FIG. 5). This results in the deformable member 52 applying a biasing force to the collar in a direction opposite the movement to push the collar into engagement with the side of the channel 19 (or spacer). Thus, the by loosening the fasteners 46 and inserting the guide assembly 26 into the channel 19, the collars 40 are automatically moved within each recess 38 and relative to the bar 28 to adjust the working width WW to the width W2 of the channel (or slightly less if a spacer is used). After the guide assembly 26 is positioned in the channel 19, the fasteners 46 are tightened to secure the collars 40 in position and set the working width WW (e.g., final or adjusted working width) of the guide assembly. In this arrangement, the collar 40 and screw 46 are concentrically offset from one another. Accordingly, the guide assembly 26 can be easily adjusted to fit the width W2 of generally any channel and account for tolerances between channels. Moreover, once the working width WW of the guide assembly is adjusted to fit the channel 19, the guide assembly can slide accurately and freely in the channel to guide movement of the miter gauge assembly 10. It is understood the guide assembly 26 can be used in other tools, besides a miter gauge, to guide movement of the tool along a work surface 14 having a channel 19.

Figure 3:
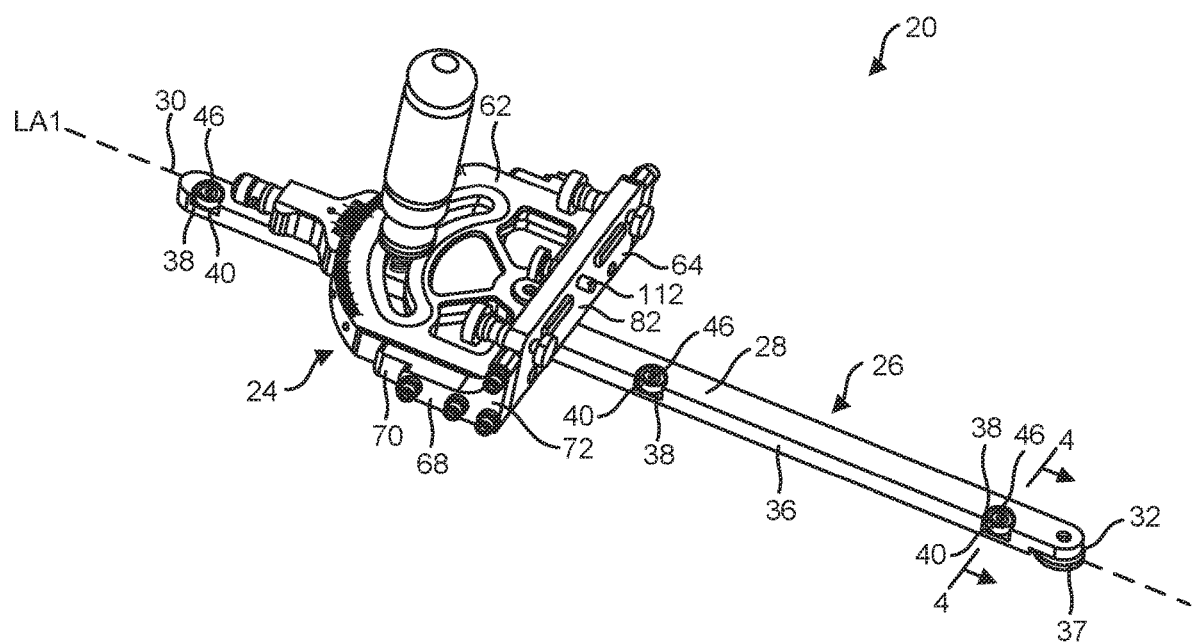
FIG. 3 is a perspective of a miter gauge of the miter gauge assembly.
Figure 6:
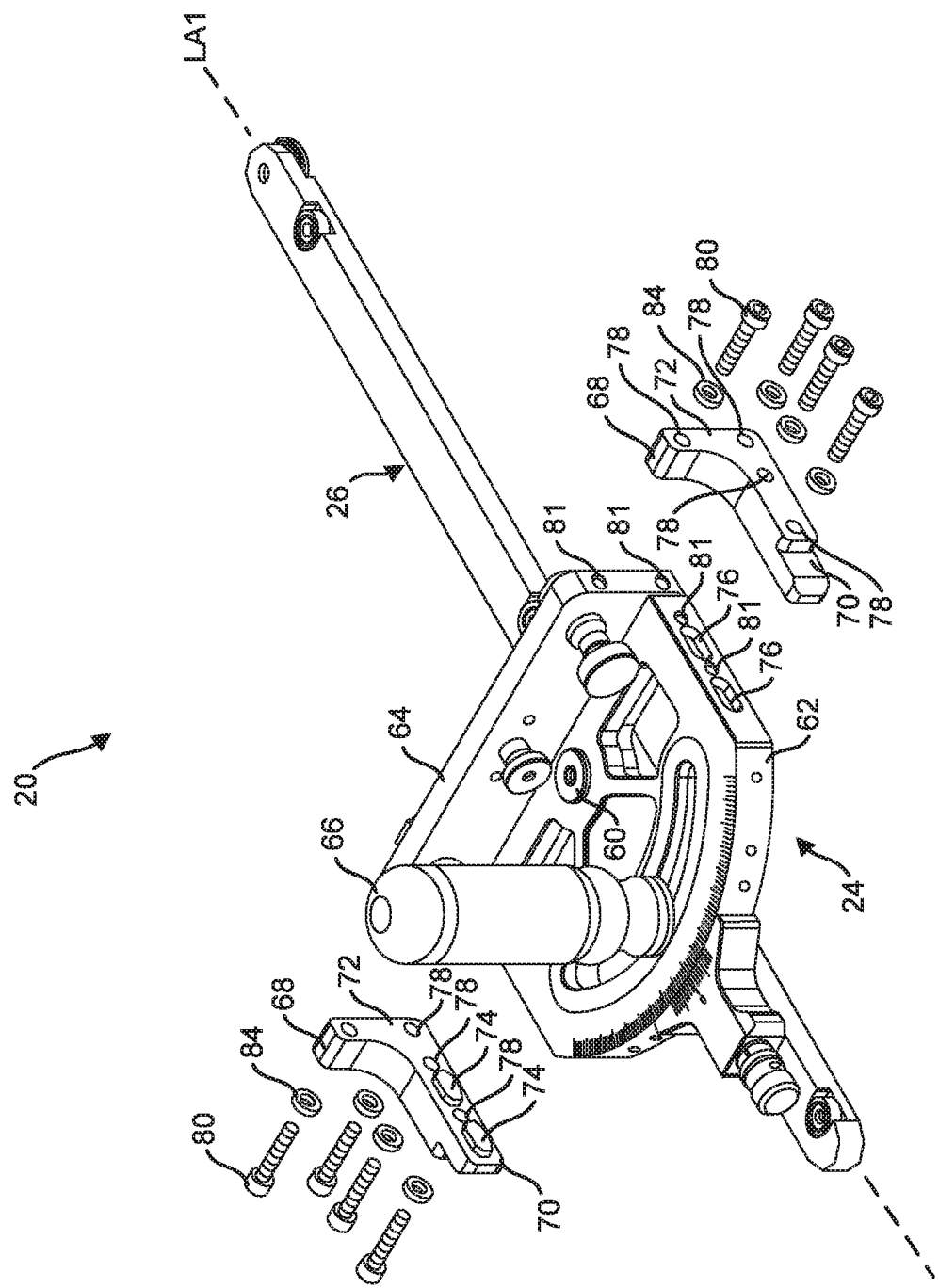
FIG. 6 is a partially exploded perspective of the miter gauge.

Referring to FIGS. 2, 3 and 6, the base assembly 24 of the miter gauge 20 includes a base 62 and a fence plate 64. The base assembly 24 is configured to engage and slide over the work surface 14. In particular, the base 62 is configured to engage and slide over the work surface 14. The base 62 is configured to be operatively coupled to the work surface 14 by the guide assembly 26. The base 62 is pivotally attached to the guide assembly 24 at pivot point 60 to enable the orientation of the base assembly 24, and therefore the orientation of the fence assembly 22, to change. Thus, when the miter gauge assembly 10 is mounted on the work surface 14, the base 62 is coupled to the work surface 14 by the guide assembly 26. The miter gauge 20 includes a handle 66 to be grasped by the user in order to move the miter gauge assembly 10 along the work surface 14. Further details concerning the handle and how the base 62 is pivotally attached to the guide assembly 26, along with other aspects of the miter gauge assembly 10, may be found in U.S. Patent Publication No. 2006/0201298, the entirety of which is hereby incorporated by reference.

The fence plate 64 is a separate component from the base 62. The fence plate 64 is operatively coupled to the base 62 and moveable relative to the base to adjust the position of the fence plate relative to the base. Two brackets 68 connect the fence plate 64 to the base 62. Each bracket 68 is connected or attached to the fence plate 64 and the base 62. In the illustrated embodiment, the two brackets 68 are disposed on opposite sides of the fence plate 64 and base 62, although other positions and numbers of brackets are within the scope of the present disclosure. The two brackets 68 are mirror images of each other and, thus, it is understood the teachings of one bracket applies equally to the other bracket. Each bracket 68 has a generally L-shape with a first leg 70 configured to extend along the side of the base 62 and a second leg 72 configured to extend along the side of the face plate 64. The first leg 70 is generally horizontal and the second leg 72 is generally vertical. The first leg 70 has two projections 74 extending outward therefrom. When the bracket 68 is attached to the base 62, the two projections 74 extend toward the other bracket 68. Each projection 74 is elongate and extends along the first leg 70 in a direction parallel to the length of the first leg.

Each side of the base 62 defines slots 76 configured to receive corresponding ones of the projections 74. As explained in more detail below, each projection 74 is slidable or movable within its slot 76 to guide the movement of each bracket 68 relative to the base 62 when the bracket is moved to adjust the position of the fence plate 64 relative to the base. In the illustrated embodiment, each bracket 68 and each side of the base 62 defines two projections 74 and slots 76, respectively, although other numbers, configurations and arraignments of projections and slots are within the scope of the present disclosure. Each slot 76 is elongate and extends along the side of the base 62 in a direction parallel to the length of the side. Thus, the elongate shapes of the projections 74 and slots 76 are generally parallel to one another. When the base assembly 24 and guide assembly 26 are in the orientation shown in FIG. 6, the elongate shapes of the projections 74 and slots 76 are generally parallel to the longitudinal axis LA1.

Each bracket 68 defines a plurality of fastener openings 78 that receive fasteners 80 (e.g., bolts) to connect the bracket 68 to the base 62 and fence plate 64. Each bracket 68 includes at least one fastener opening 78 in the first leg 72 to receive a fastener 80 that connects the bracket to the base 62. Likewise, each bracket 68 includes at least one fastener opening 78 in the second leg 74 to receive a fastener 80 that connects the bracket to the fence plate 64. In the illustrated embodiment, each bracket 68 defines four fastener openings 78, with two fastener openings used to connect each bracket to the base 62 and two fastener opening used to connect each bracket to the fence plate 64. In the illustrated embodiment, two fastener openings 78 are in the first leg 70, one fastener opening is in the second leg 72 and one fastener opening is at the intersection of the first and second legs. Other arrangements and number of fastener openings 78 are within the scope of the present disclosure. The fastener openings 78 are smooth (e.g., non-threaded). In addition, the fastener openings 78 are larger than the fasteners 80 (e.g., oversized) in order to allow each fastener to move and be positioned in each fastener opening. As will be explained in more detail below, because the fastener openings 78 are oversized (e.g., provide ample clearance for the fasteners 80), the position of the fence plate 64 relative to the base 62 can be adjusted or changed.

As shown in FIG. 6, each fastener opening 78 is generally aligned with a corresponding fastener opening 81 in either the side of the base 62 or the side of the fence plate 64. Accordingly, the number and positioning of fastener opening 78 corresponds to the number and position of fastener openings 81. In the illustrated embodiment, each side of the base 62 defines two fastener openings 81 and each side of the fence plate 64 defines two fastener openings. Fastener openings 81 are threaded and threadably receive the fasteners 80.

To secure the fence plate 64 to the base 62, fasteners 80 are inserting through the fastener openings 78 in the bracket 68 and threaded into the fastener openings 81 in the fence plate and base. When the fastener 80 is rotatably tightened against the bracket 68, the fastener secures and fixes the position of the bracket relative to the base 62 or fence plate 64, depending on which component the fastener 80 is threaded into. The head of each fastener 80 (via washers 84) bears against the bracket 68 and applies a clamping force to the bracket to prevent the bracket from moving relative to either the base 62 or fence plate 64. Accordingly, when all the fasteners 80 are tightened against the bracket 68, the position of the fence plate 64 relative to the base 62 is fixed.

The brackets 68 enable the adjustment of the fence plate 64 relative to the base 62 in two directions. When the base assembly 24 is in the position relative to the guide assembly 26 shown in FIG. 6 (e.g., the base assembly is not rotated relative to the guide assembly), the fence plate 64 can be moved or set so that a fence engaging face 82 of the fence plate is square to the blade 16 and the work surface 14. The fence engaging face 82 is generally planar and, as described in more detail below, engages the fence assembly 22. Each bracket 68 is movable relative to the base 62 to adjust the orientation of the fence plate relative to the x-axis in order to square the fence engaging face 82 to the blade 16. Likewise, the fence plate 64 is movable relative to each bracket 68 to adjust the orientation of the fence plate relative to the z-axis in order to square the fence engaging face 82 to the work surface 14. As a result of squaring the fence engaging face 82 to the blade 16 and work surface 14, the fence assembly 22 connected to the fence plate 64 will also be square to the blade 16 and work surface 14. This results in the miter gauge assembly 10 guiding stock in the feed direction and against the blade 16 with a high degree of precision to produce more accurate cuts.

To adjust the position of the fence plate 64 relative to the base 62, the fasteners 80 are loosened. This allows the fasteners 80 and/or bracket 68 to move relative to one another due to the oversized fastener openings 78. To square the fence engaging face 82 to the blade 16, each bracket 68 can independently move or slide along the side of the base 62 in a direction generally parallel to the longitudinal axis LA1 and y-axis (when the base assembly 24 is in the position shown in FIG. 6). By moving the brackets 68 independently along the base 62 in a direction parallel to the y-axis, the orientation of the face plate relative to the x-axis can be changed. Each projection 74 is slidable within its respective slot 76 to guide the movement of each bracket 68 relative to the base 62 when the bracket is moved to square the fence engaging face 82 to the blade 16. Each slot 76 is longer than the projection 74 in order to allow the projection to slide freely therein and in a direction parallel to the y-axis. The height of each projection 74 matches the height of each slot 76 to prevent the projection from moving in a direction parallel to the z-axis. Thus, the engagement between each projection 74 and corresponding slot 76 prevents the bracket 68 from moving relative to the base 62 in a direction that is generally parallel to the z-axis. In other words, the projections 74 constrain the movement of the bracket 68 from moving vertically. This prevents any misalignment of the fence plate 64 relative to both the work surface 14 and blade 16 that may result if the brackets 68 where free to move in a direction parallel to the z-axis. The larger fastener openings 78 of the bracket 68 allow the bracket to move relative to the fasteners 80 threadably secured to the base 62. The clearance provide by the fastener openings 78 needs to be enough to allow the fence plate to be moved in a direction parallel to the y-axis to account for any alignment variations between the channel 19 and the blade 16. In one embodiment, clearance provided by the fastener openings 78 allows the brackets to move 1/16 inch (1.6 mm) or less relative to the base 62. Once the fence plate 64 is positioned relative to the base 62, the fasteners 80 are tightened to fix the position of the brackets 68 relative to the base.

To square the fence engaging face 82 to the work surface 14, the fence plate 64 can be moved relative to both brackets 68. In particular, the fence plate 64 can be tilted in a direction of rotation about the x-axis. Because the fastener openings 78 are larger than the fasteners 80, each fastener is free to move within the fastener opening to square the fence engaging face 82 to the work surface 14. As the fence plate 64 is tilted or rotated about the x-axis, each fastener 80 threadably secured to the fence plate 64 moves within its corresponding the fastener openings 78 as the orientation of the fence plate is adjusted relative to the brackets 68 and, by extension, the base 62. The clearance provided by the fastener openings 78 needs to be enough to allow the fence plate to rotate a few degrees to account for any alignment variations between a work table 12 and the base assembly 24. Once the fence plate 64 is positioned relative to the base 62, the fasteners 80 are tightened to fix the position of the fence plate relative to the brackets 68.

Referring to FIGS. 2 and 7-10, the fence assembly 22 of the miter gauge assembly 10 is connected to the miter gauge 20. The fence assembly 22 includes a fence 100 configured to be connected to the miter gauge 20. The fence 100 has opposite ends and a longitudinal axis LA2 extending between the opposite ends. The fence 100 has a mounting face 102 and defines a t-slot 104 that opens toward the mounting face and extends along the fence, between the opposite ends, in a direction generally parallel to the longitudinal axis LA2. The fence 100 is configured to engage the stock. The fence has a guide face 105 opposite the mounting face 102 that engages and guides the stock in the feed direction F as the miter gauge assembly 10 is moved by an operator.

The fence 100 and base assembly 24 are movably mounted to one another such that the fence is selectively positionable longitudinally along the base assembly to adjust the longitudinal position of the fence on the base assembly. In particular, the fence 100 is slidably coupled to the fence plate 64 such that fence and fence plate can move relative to one another. The base assembly 24 includes two knobs 86 that have a threaded shaft extending through the face plate 64 and into the t-slot 104. Each threaded shaft is connected to a clamp nut disposed in the t-slot 104. The knobs 86 can be manually rotated for selectively loosening and tightening the clamp nut. Rotating the knobs 86 to loosen the clamp nuts allows the fence 100 and base assembly 24 to move or slide relative to one another. Rotating the knobs 86 to tighten the clamp nuts secures or fixes the fence 100 and base assembly 24 relative to one another. When the fence 100 is secured to the base assembly 24, the mounting face 102 and fence engaging face 82 of the fence plate 64 are in flush engagement with one another. Thus, the orientation of the fence engaging face 82 determines the orientation of the fence 100.

Figure 13:
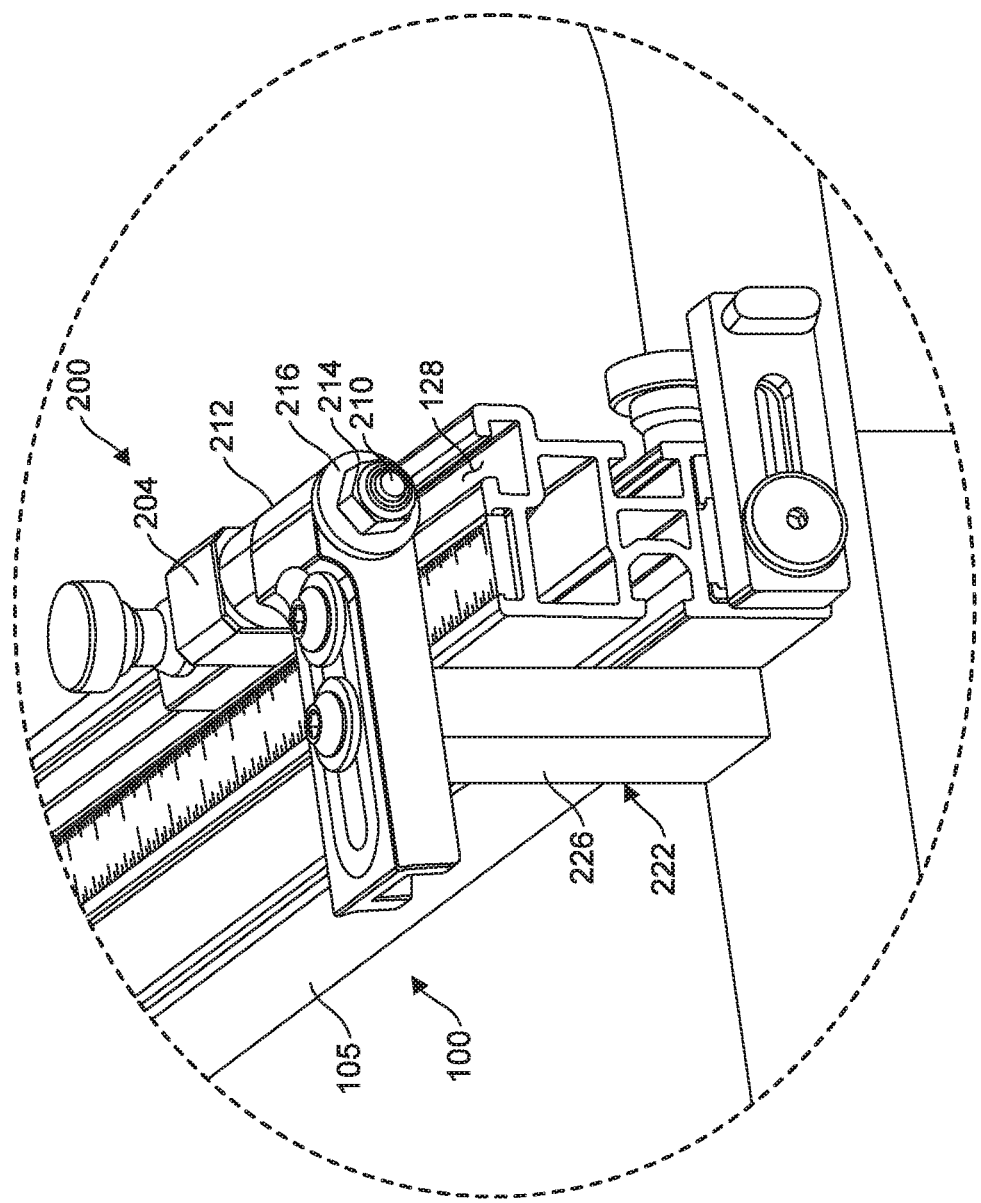
FIG. 13 is a fragmentary perspective of the miter gauge assembly, illustrating the stop attached to the fence.
Figure 14:
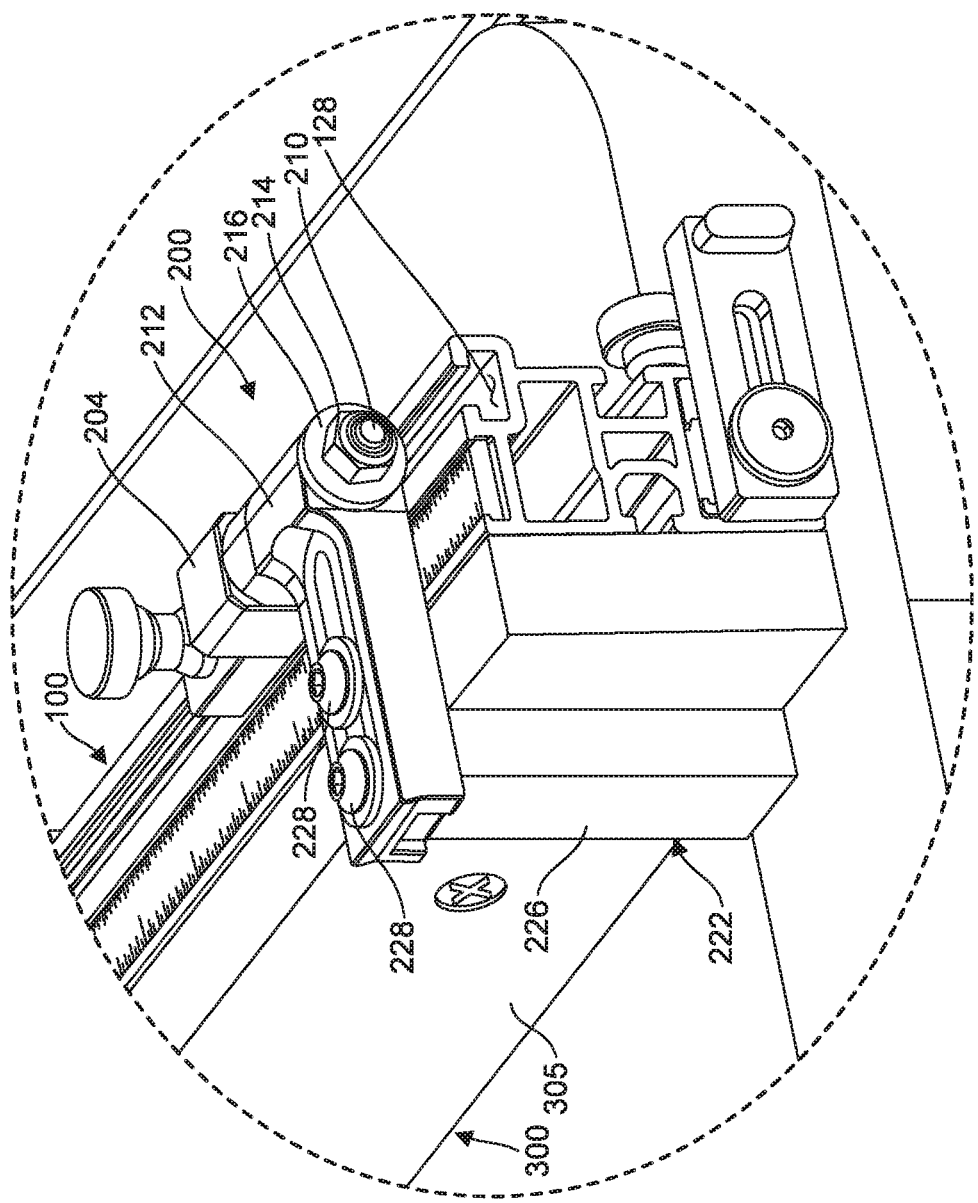
FIG. 14 is a fragmentary perspective of the miter gauge assembly, illustrating the stop attached to a fence having a sub-fence.

The fence assembly 22 includes a scale 106 on the fence 100. The scale include indicia (FIG. 13) indicative of units of distance (e.g., inch, cm, etc.) In the illustrated embodiment, the scale 106 is disposed in another slot 108 on the top of the fence. The scale 106 aids the operator in cutting the stock to the correct dimension. The scale 106 is selectively positionable longitudinally in the slot 108 to calibrate or position the scale correctly on the fence 100 relative to the blade 16. During operation, the fence 100 is frequently moved relative to the base assembly 24 by the operator for any number of reasons, which include, but are not limited to, moving the fence closer to or farther from the blade and/or accounting for the distance between a channel and a cutting element of a particular work table. Because of the frequency in which the fence 100 and base assembly 24 are moved relative to one another during operation, the scale 106 is frequently, if not nearly always, improperly positioned relative to the blade 16. This requires the operator to reposition the scale 106 on the fence 100 every time the fence and base assembly 24 are moved relative to one another in order to properly calibrate the scale so that the scale can aid the operator in the cutting of stock to the correct dimension. It is understood, the distance between the base assembly 24 and the blade 16 (specifically, the distance between the base assembly and a line parallel to the y-axis that extends through the blade) is constant due to the engagement of the guide assembly 26 in the channel 19.

To address this issue, the base assembly 24 of the current disclosure is configured to have a preset longitudinal position or home position on the fence 100. The scale 106 is calibrated when the base assembly 24 is at the home position on the fence 100. As a result, no matter how frequently or how greatly the fence 100 and base assembly 24 are moved relative to one another, the base assembly can always be returned to the home position on the fence. By moving the base assembly 24 back to the home position after the fence 100 and base assembly have been moved relative to one another, the scale 106 remains properly calibrated relative to the blade 16. In other words, the scale 106 is properly calibrated as long as the base assembly 24 is at the home position on the fence 100. Accordingly, the operator knows the scale 106 is properly calibrated when the base assembly 24 is at the home position, instead of repositioning the scale 106 every time the fence 100 and base assembly are moved relative to one another. It is understood there may be other reasons for wanting to establish a home position between the base assembly 24 and fence 100. For example, an operator may want to establish a home position that positions the fence a certain distance away from the blade 16.

To establish the home position between the fence 100 and the base assembly 24, the fence defines a locating hole 110 (broadly, a first locating member) and the base assembly 24 includes a locating pin 112 (broadly, a second locating member) selectively insertable into the locating hole. In the illustrated embodiment, the fence 100 includes a locating nut 114 that defines the locating hole 110. Other configurations of the locating hole are within the scope of the present disclosure. For example, locating hole can be defined by the mounting face 102 of the fence 100. The position of the locating hole 110 on the fence 100 determines the home position of the base assembly 24 on the fence.

Figure 9:
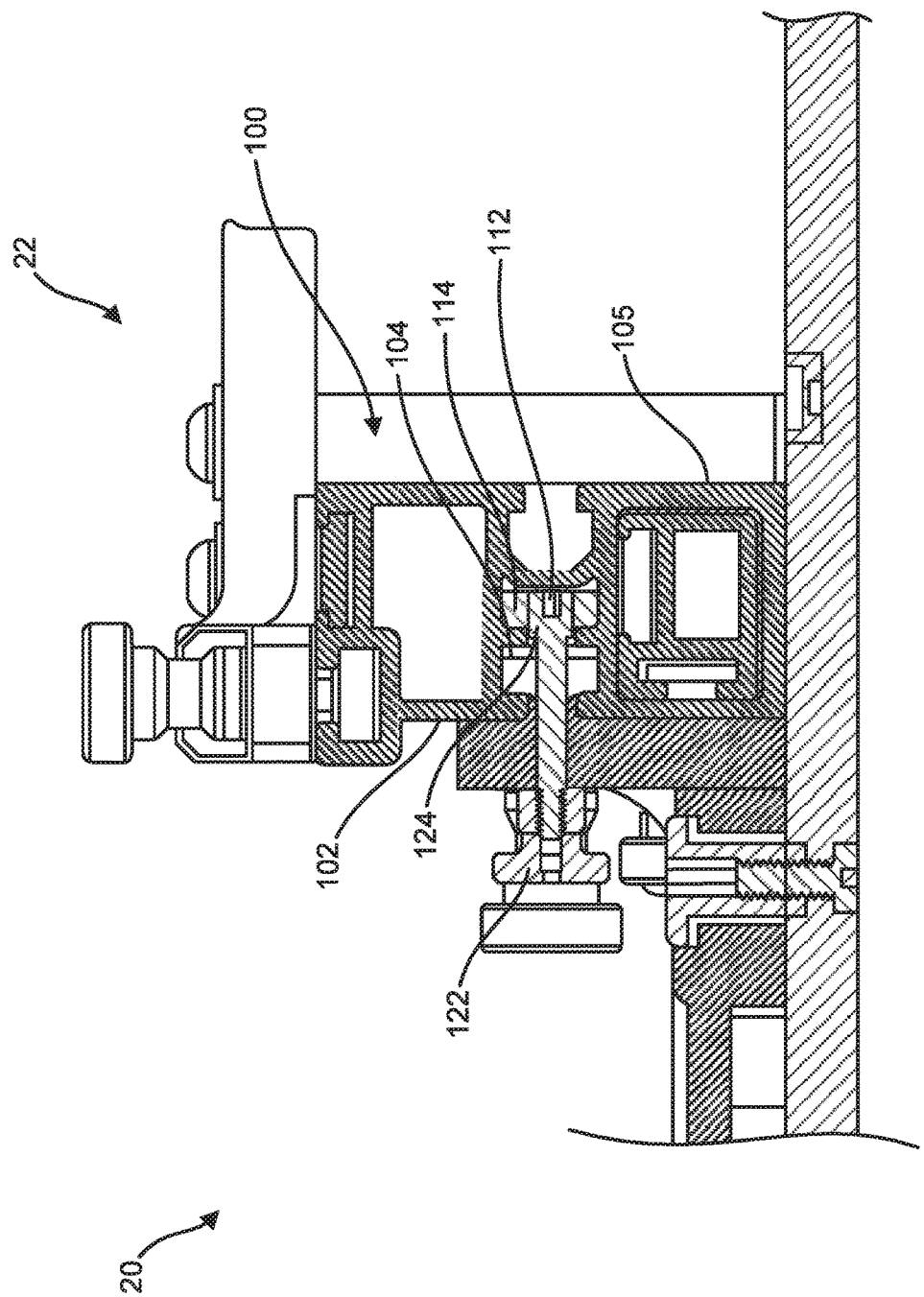
FIG. 9 is a fragmentary cross section taken through line 9-9 of FIG. 2 with a locating pin of the miter gauge in a locked position.
Figure 10:
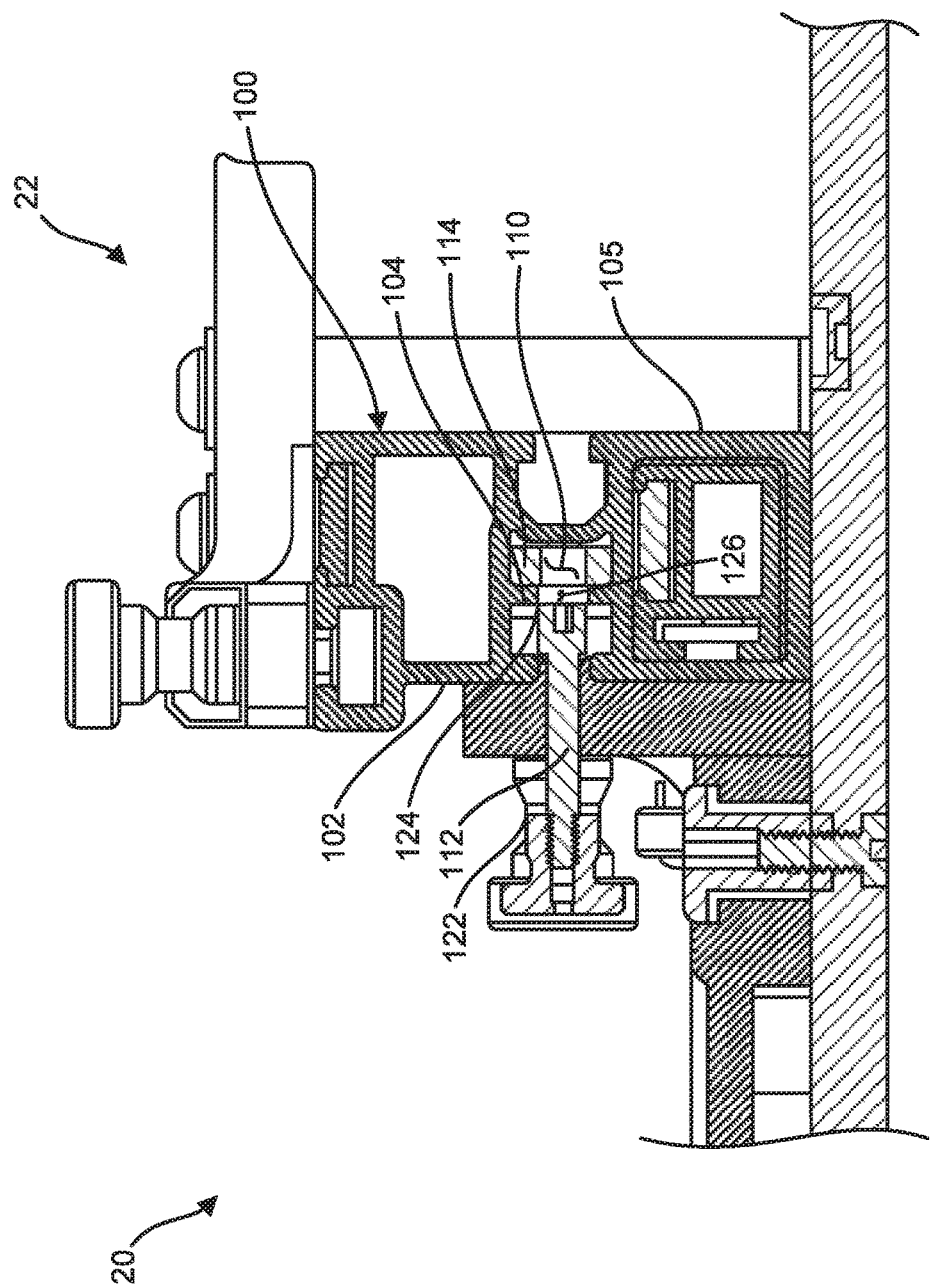
FIG. 10 is the fragmentary cross section similar to FIG. 9 with the locating pin in an unlocked position.
Figure 11:
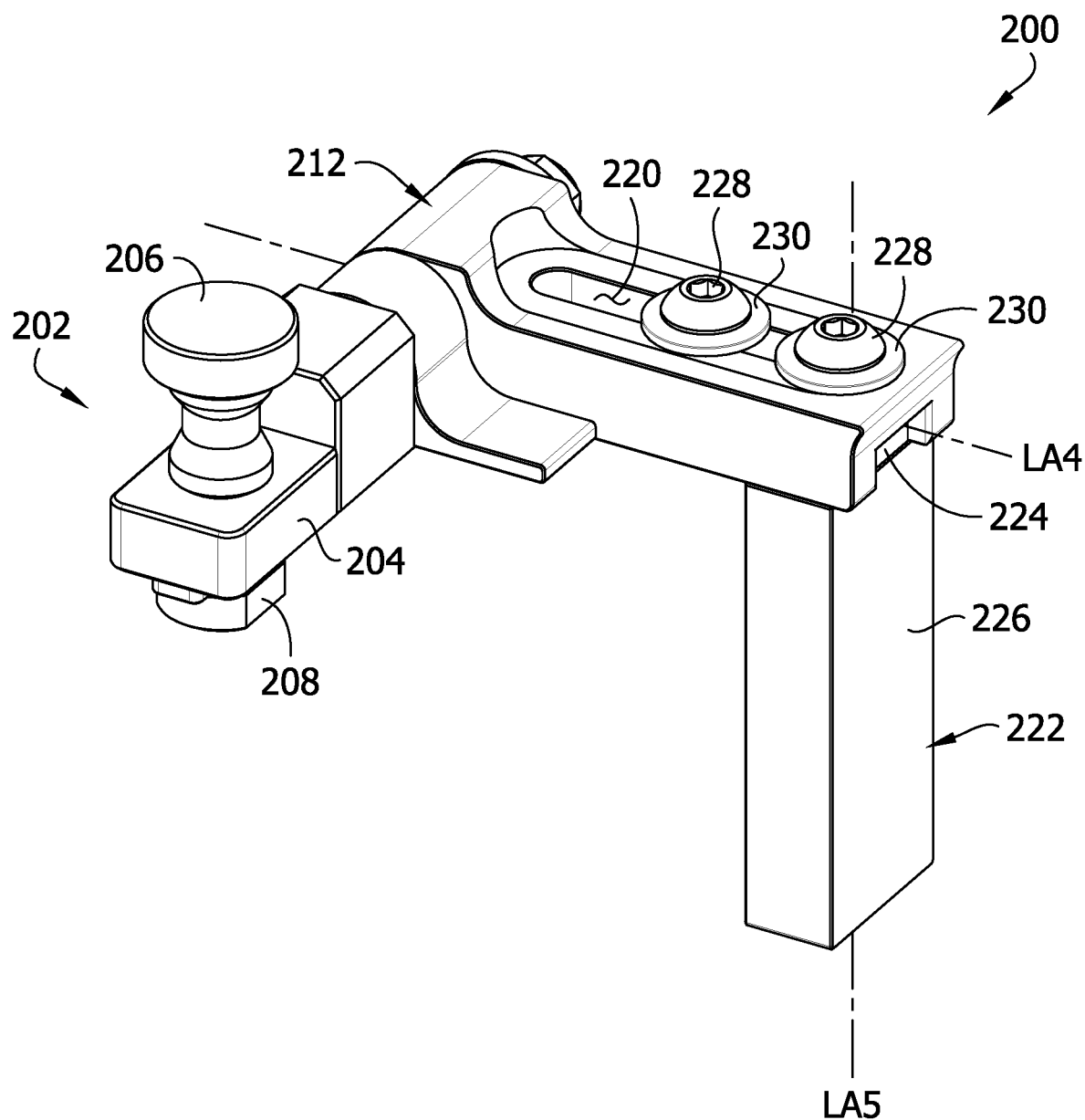
FIG. 11 is a perspective of a stop of the miter gauge assembly.
Figure 12:
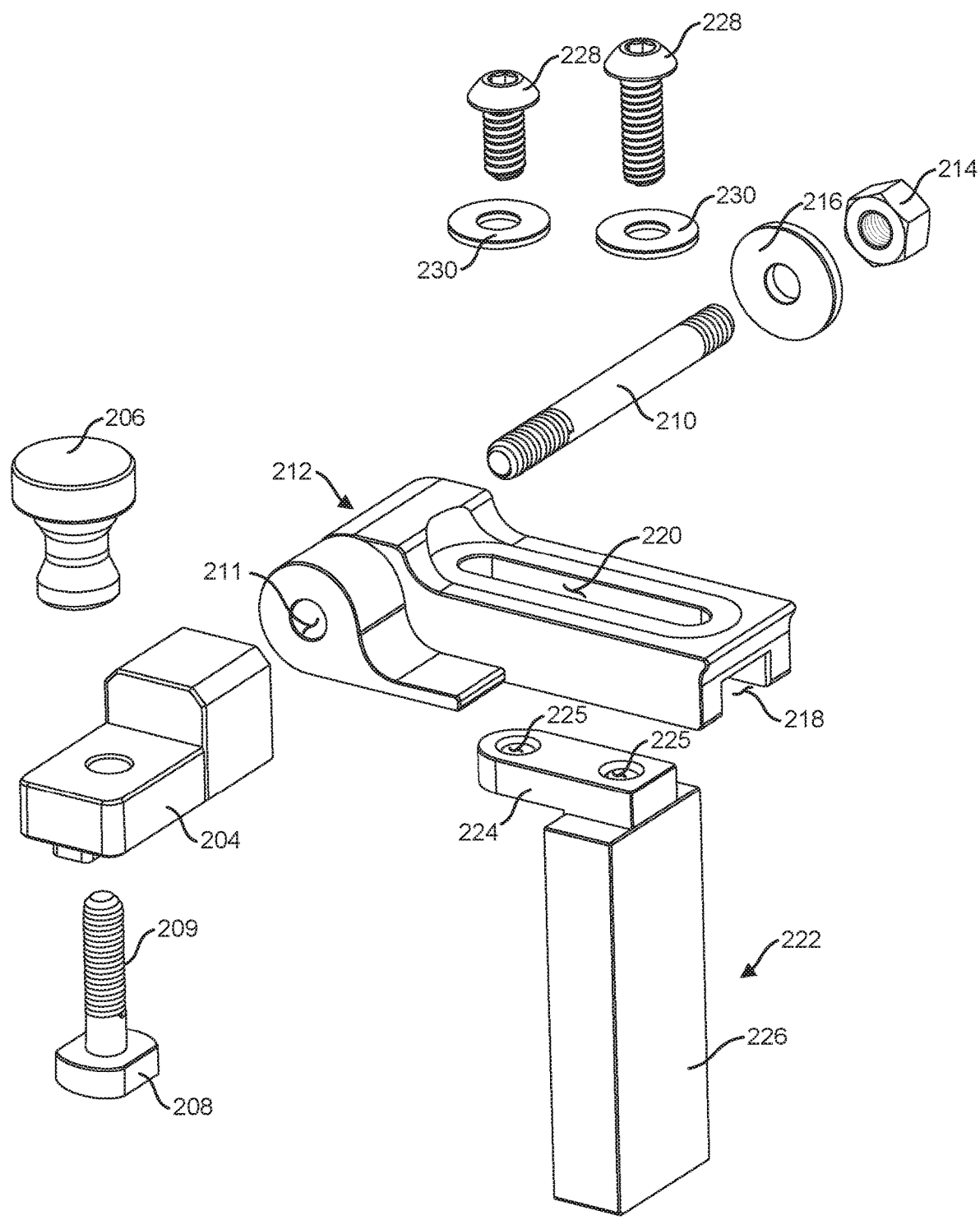
FIG. 12 is an exploded perspective of the stop.

Referring to FIGS. 9 and 10, the locating pin 112 is operatively connected to the base assembly 24 and is configured to be received in or inserted into the locating hole 110 of the fence 100. In the illustrated embodiment, the locating pin 112 extends through an opening in the fence plate 64 and into the locating hole 110. The locating pin 112 is longitudinally slidable through the opening in the fence plate 64. The locating pin 112 is moveable between a locked position (FIG. 9) and an unlocked position (FIG. 10). In the locked position, the locating pin 112 is engaged with (e.g., inserted in) the locating hole 110 to inhibit longitudinal movement of the fence 100 along the base assembly 24 and hold the base assembly at the home position on the fence. In the unlocked position, the locating pin is free of engagement with (e.g., disengages) the locating hole 110 so that the fence 100 is free to move to other longitudinal positions along the base assembly 24. In order to move the base assembly 24 and fence 100 relative to one another, the knobs 86 must also be loosened to release the clamp nuts. The locating pin 112 is connected to a knob 122 that can be manually grasped by the operator to slide or move the locating pin between the locked and unlocked positions. In one embodiment, the locating pin 112 may also include a shoulder 124 configured to engage the fence engaging face 82 to prevent unintentional withdrawal of the locating pin from the fence plate 64. In one embodiment, the locating pin 112 may be releasably biased in the locked position. For example, a spring (not shown) may be included on the locating pin 112 between the fence plate 64 and the shoulder 124 to bias the locating pin in the locked position.

Figure 7:
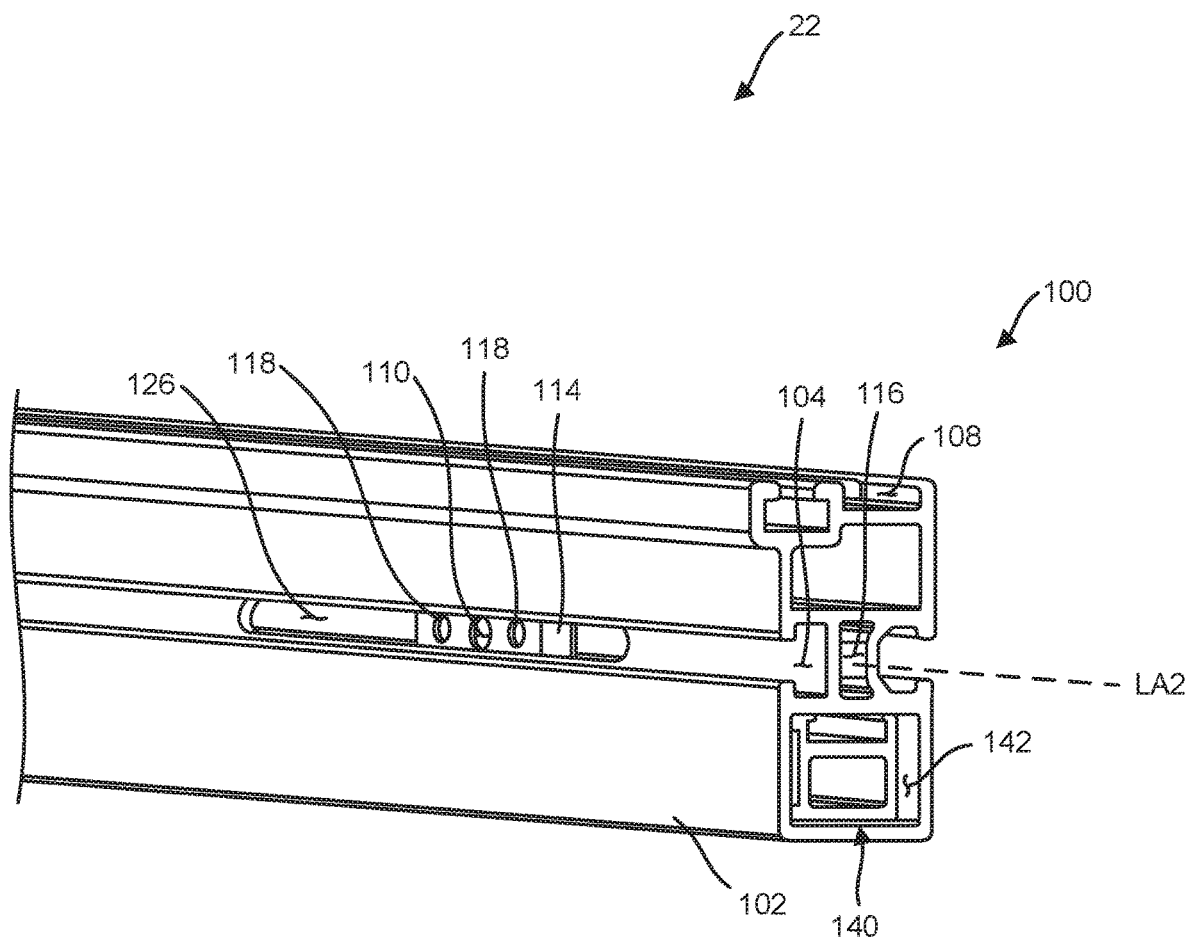
FIG. 7 is an enlarged fragmentary perspective of a fence of the miter gauge assembly.
Figure 8:
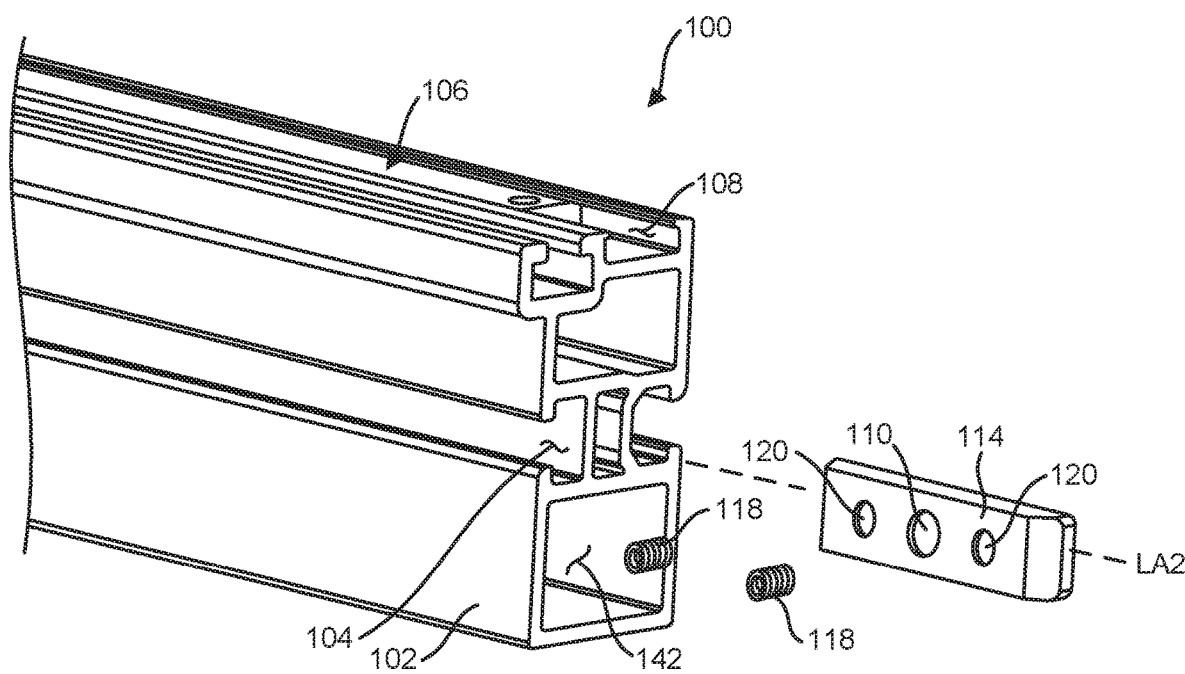
FIG. 8 is the perspective of FIG. 7 with parts exploded.

The locating hole 110 can be selectively positioned longitudinally along the fence to adjust or change the home position of the base assembly 24 on the fence. As shown in FIG. 7, the fence 100 defines a race 116 that receives the locating nut 114. The race 116 extends longitudinally along the fence 100. The locating nut 114 is movably disposed or slidable within the race 116. The locating nut 114 includes two set screws 118 (broadly, at least one set screw) threadably received in threaded holes 120 defined by and extending through the locating nut. The set screws 118 are used to set or fix the position of the locating nut 114 in the race 116. Thus, the locating nut 114 is selectively positionable longitudinally within the race 116 to adjust the home position of the base assembly 24 on the fence 100. To set the position of the locating nut 114, and thereby the locating hole 110, the set screws 118 are rotated until the locating nut clamps against one side of the race to secure the locking nut in position within the race 116. In this position, the locating nut 114 is fixed in position and inhibited or prevented from moving within the race 116. Loosening the set screws 118 allows the locating nut 114 to move freely within the race 116. In one embodiment, the locating hole 110 is positioned along the fence 100 so that when the base assembly 24 is at the home position on the fence, the fence is approximately ¹⁄₁₆ inch (1.6 mm) from the blade 16.

In the illustrated embodiment, the t-slot 104 that receives the clamp nuts to secure the fence 100 to the base assembly 24 is disposed between the race 116 that receives the locating nut 114 and the fence plate 64, when the fence is secured to the fence plate. In order to permit the locating pin 112 to reach the locating hole 110, the portion of the fence 100 separating the t-slot 104 and race 116 defines a window 126 (FIG. 7). The window 126 allows the locating pin 112 to extend through the t-slot 104 and the portion of the fence 100 separating the t-slot and the race 116 and into the race to engage the locating hole 110. In the illustrated embodiment, the window 126 is disposed toward one end of the fence 100 and is shorter than the length of the fence, although, other configurations are within the scope of the present disclosure. It is understood that the locating nut 114 could be inserted into other races or slots defined by the fence 110.

Referring to FIGS. 2 and 15-19, the fence assembly 22 includes a fence stop 150. The fence stop 150 is configured to engage the stock. In operation, the fence stop 150 can engage the end or side of the stock to set the location of the stock relative to the fence assembly 22. In the illustrated embodiment, the fence stop 150 is attached to an end of a fence extension bar 140. The fence extension bar 140 is longitudinally slidable within a race 142 (FIG. 7) defined by the fence 100 and extends outward from the end of the fence. The fence extension bar 140 defines a t-slot 144 that receives a clamp nut (FIG. 20) connected to a threaded rod extending therefrom. A knob 146 is threadably secured to the threaded rod. Rotating the knob 146 to loosen the clamp nut allows the fence extension bar 140 to move or slide within the race 142. Rotating the knob 146 to tighten the clamp nut secures or fixes the fence extension bar 140 on the fence 100. Attaching the fence stop 150 to the fence extension bar 140 allows the fence stop to be adjustably positioned relative to the blade 16 and to be positioned further away from the blade than if the fence stop was attached to the fence 100. It is understood the fence stop 150 can be attached to the fence 100 instead of the fence extension bar 140.

The fence stop 150 includes a mounting block 152 and a sliding member 154. The mounting block 152 attaches the fence stop 150 to the fence extension bar 140. The fence extension bar 140 defines a race 148 that receives the mounting block. The mounting block 152 has a cross-sectional shape that generally corresponds to (e.g., matches) the cross-sectional shape of the race 148 to form a close fitting relationship with the race. The mounting block defines an opening 156 extending there-through that aligns with two openings 147 in the fence extension bar on opposite sides of the race 148. A locking pin 158 extends through the aligned openings 147, 156 to secure the mounting block 152 to the fence extension bar 140.

The sliding member 154 is configured to engage the stock to prevent the stock from moving relative to the fence assembly 22. The sliding member 154 has opposite ends 160 and 162, respectively, and defines a longitudinal axis LA3 extending between the opposite ends. The illustrated sliding member has a generally rectangular shape, although other configurations are within the scope of the present disclosure. The sliding member 154 defines a slot 166 extending along the sliding member. The slot 166 is generally parallel to the longitudinal axis LA3. The slot 166 has generally closed, semi-circular ends. The sliding member 154 defines a channel 164 that extends from the one end 160 of the sliding member to the other end of the slot 166 along the side of the sliding member. The channel 164 is in communication with the slot 166. The sliding member 154 includes a finger tab 168 opposite the channel 164 and adjacent to the end 160.

The fence stop 150 includes a fastener 170 (e.g., a bolt) to movably or slidably connect the sliding member 154 to the mounting block 152. The mounting block 152 defines a threaded hole 172 to threadably receive the fastener 170. The fastener 170 is inserted through (e.g., received in) the slot 166 to connect the sliding member 154 to the mounting block 152 (more broadly, the fence extension bar 140 or fence 100). The fastener 170 is tightened against the sliding member 154 to secure the sliding member to the mounting block but not so tight as to prevent the sliding member from moving or sliding relative to the fastener. The illustrated mounting block 152 also includes a threaded hole 174 in communication with the threaded hole 172 that receives a set screw 175 to engage the fastener 170 and prevent the fastener from unintentionally withdrawing from the mounting block. The threaded hole 174 that receives the set screw 175 aligns with an opening 149 in the fence extension 140 bar to permit access to the set screw 175 when the mounting block 152 is attached to the fence extension bar.

Figure 15:
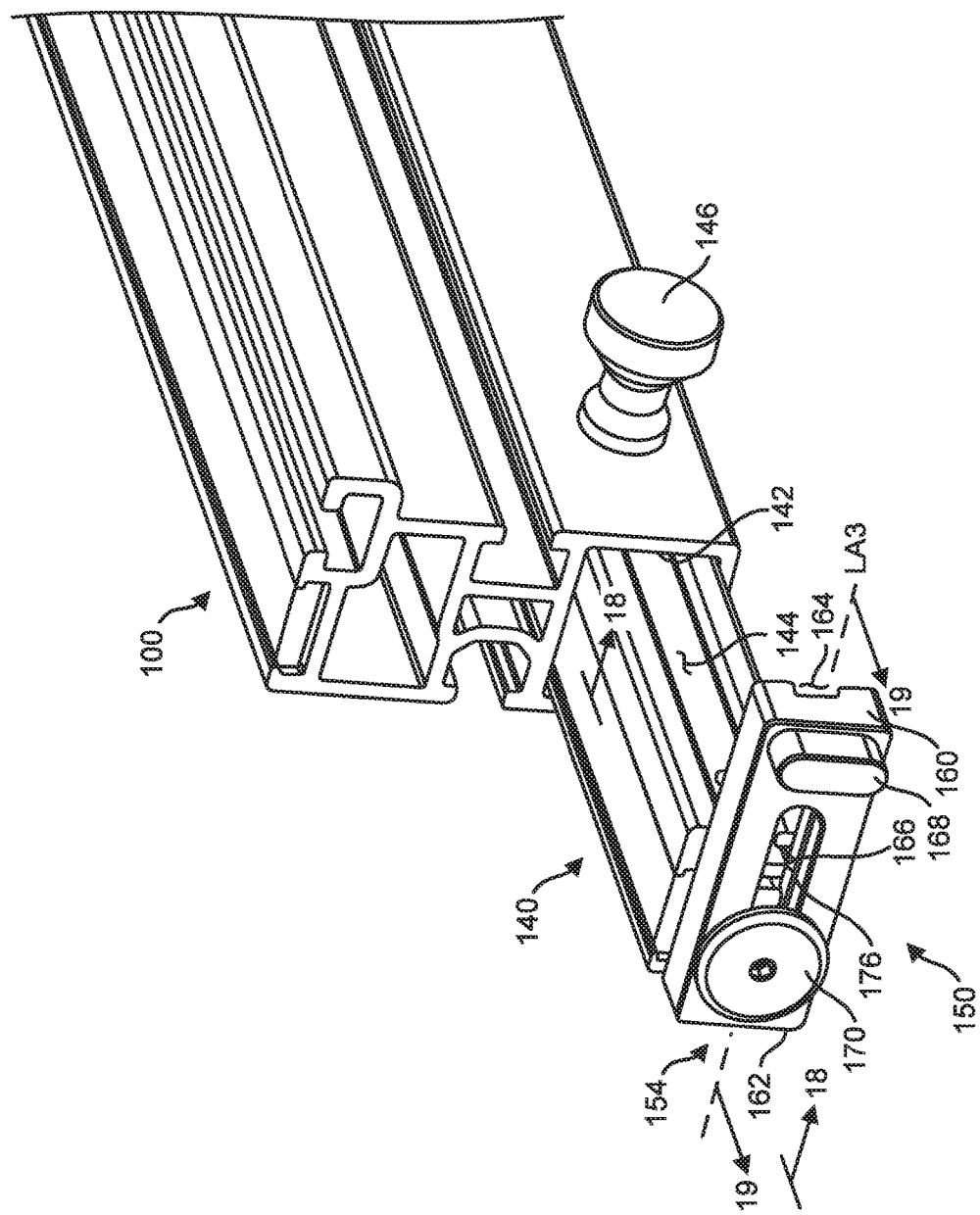
FIG. 15 is a fragmentary rear perspective of the fence, illustrating a fence stop of the fence of the miter gauge assembly in a retracted position.
Figure 16:
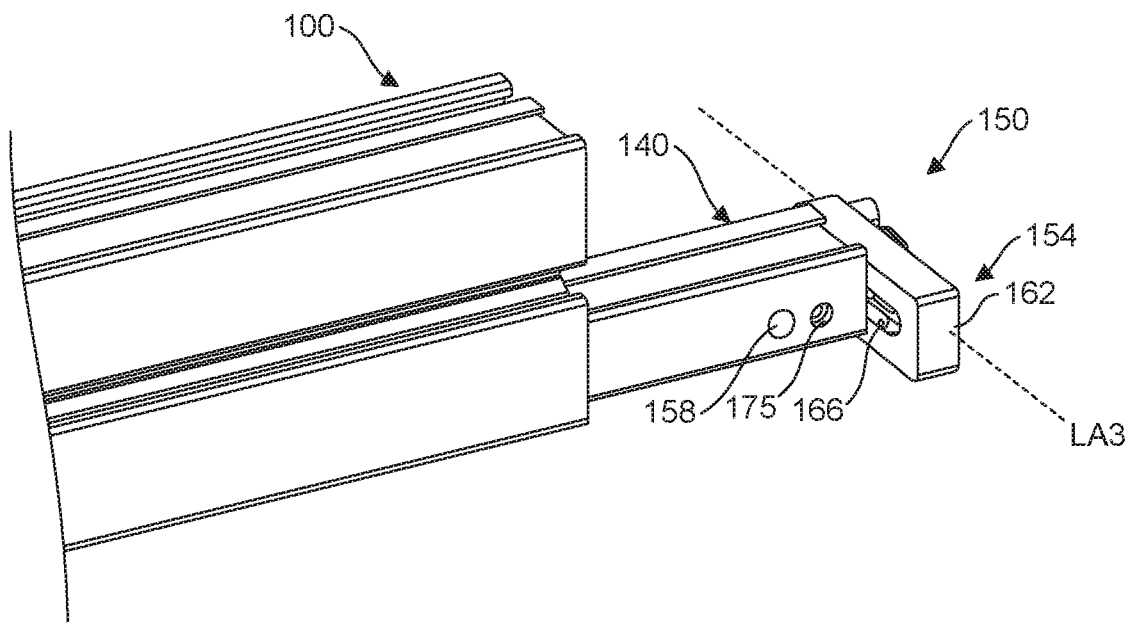
FIG. 16 is a fragmentary front perspective of the fence, illustrating the fence stop in an extended position.
Figure 17:
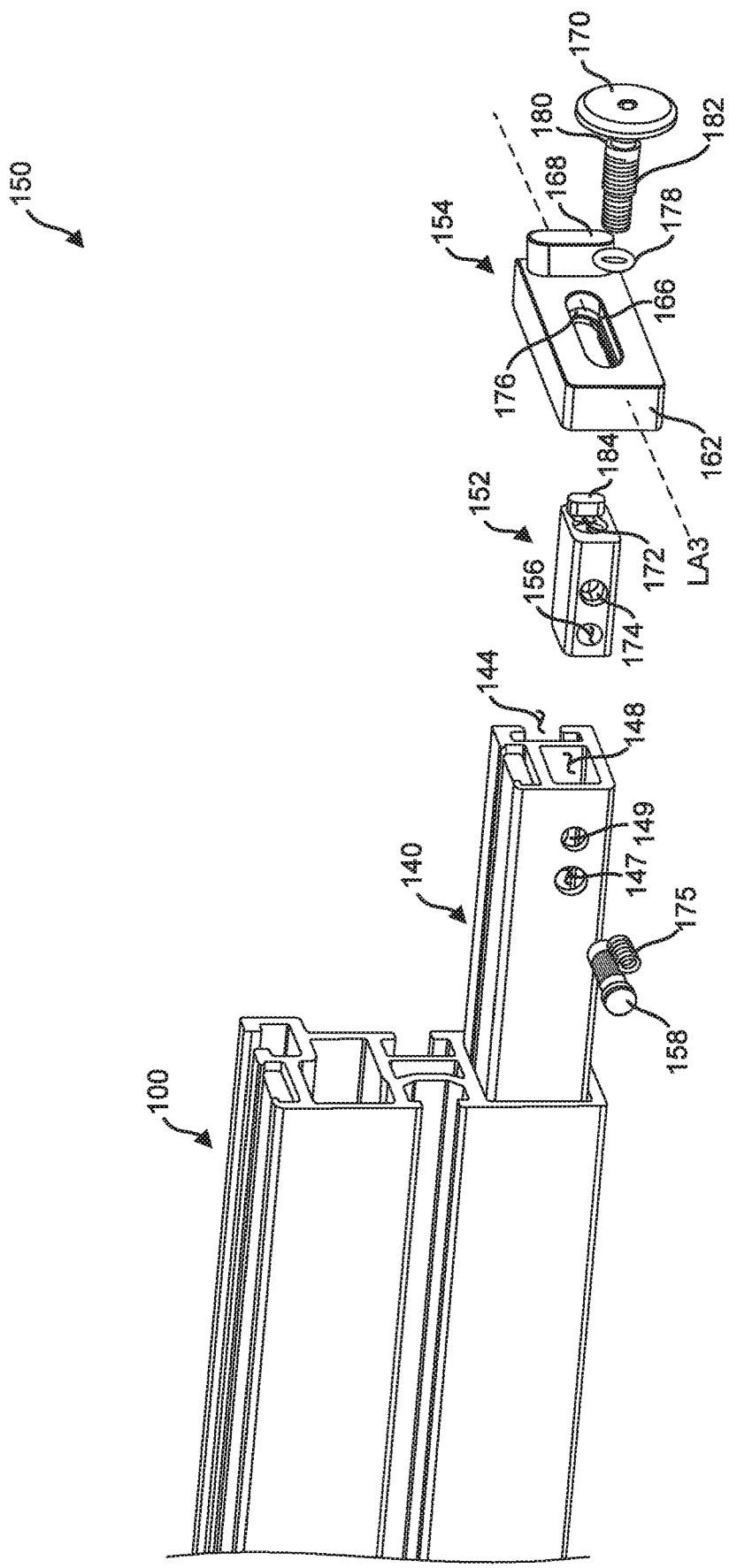
FIG. 17 is a fragmentary exploded perspective of the fence stop.
Figure 18:
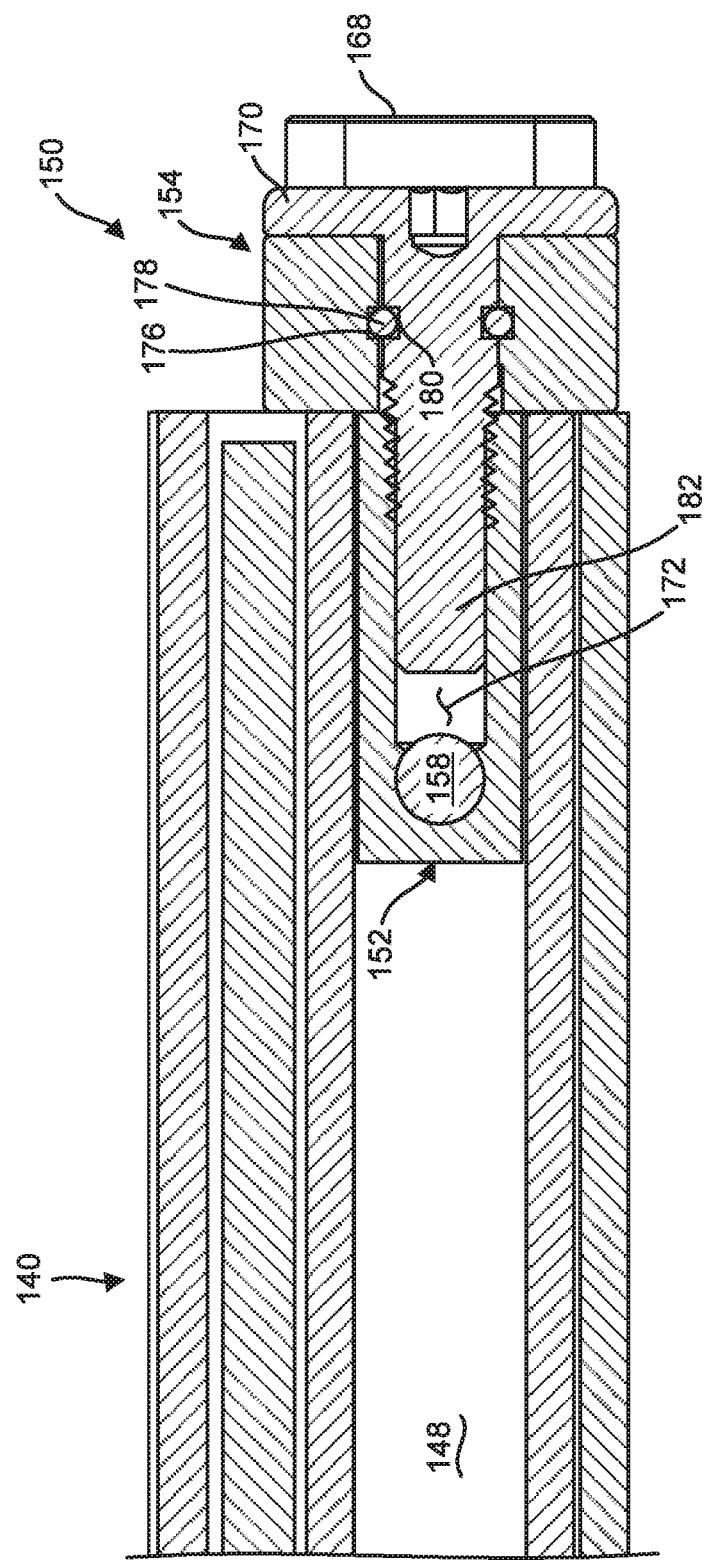
FIG. 18 is an enlarged fragmentary cross section taken through line 18-18 of FIG. 15.

The sliding member 154 of the fence stop 150 is configured to move between an extended position (FIG. 16) and a retracted position (FIG. 15). In the extended position, the sliding member 154 extends past the guide face 105 of the fence 100. In this position, the end or side of the stock can butt against the sliding member 154. This prevents the stock from moving along the fence assembly 22 in a direction away from the blade 16. In the retracted position, the sliding member does not extend past the guide face 105 of the fence 100. In this position, the stock does not engage the sliding member 154 when the stock abuts the guide face 105 of the fence 100. The fastener 170 is disposed at and engages one end of the slot 166 in the extended position and the opposite end of the slot in the retracted position.

The fence stop 150 includes an O-ring 178 configured to secure or hold the sliding member in the extended and retracted positions. The O-ring 178 is mounted on the fastener 170 and engages the sliding member 154 to inhibit unintentional movement of the sliding member. The sliding member 154 defines a groove or channel 176 in communication with the slot 166. The groove 176 is configured to receive at least a portion of the O-ring 178 mounted on the fastener 170 to prevent the sliding member from moving relative to the fastener (more broadly, the mounting block 152, the fence extension bar 140 or the fence 100). The groove 176 extends circumferentially around the slot. This allows the portion of the groove 176 at each end of the slot 166 to receive the O-ring 178.

Figure 19:
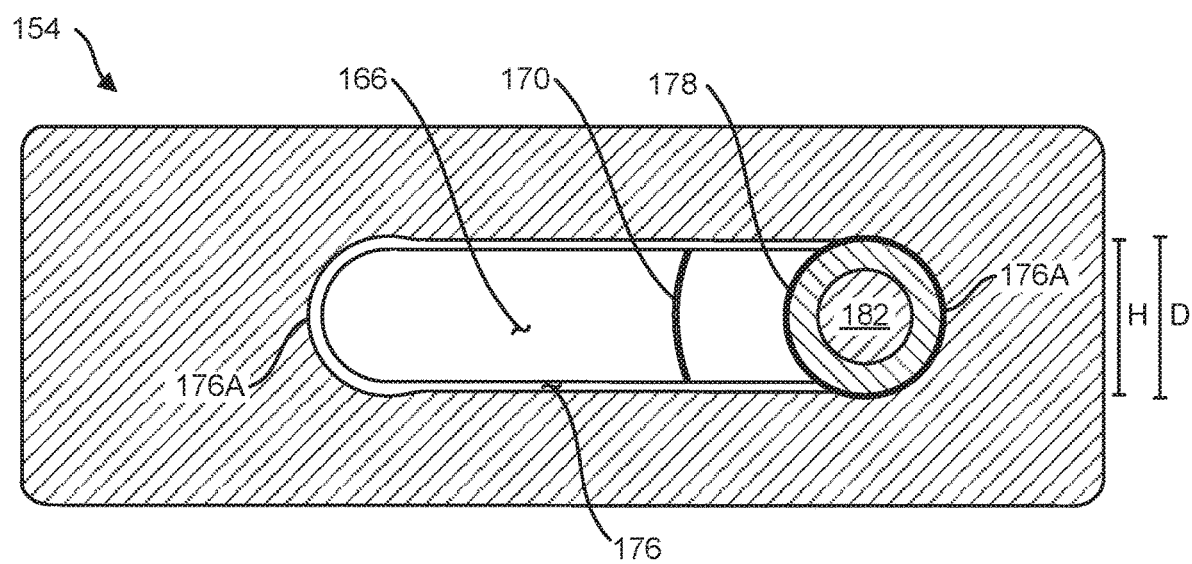
FIG. 19 is a cross section taken through line 19-19 of FIG. 15.
Figure 20:
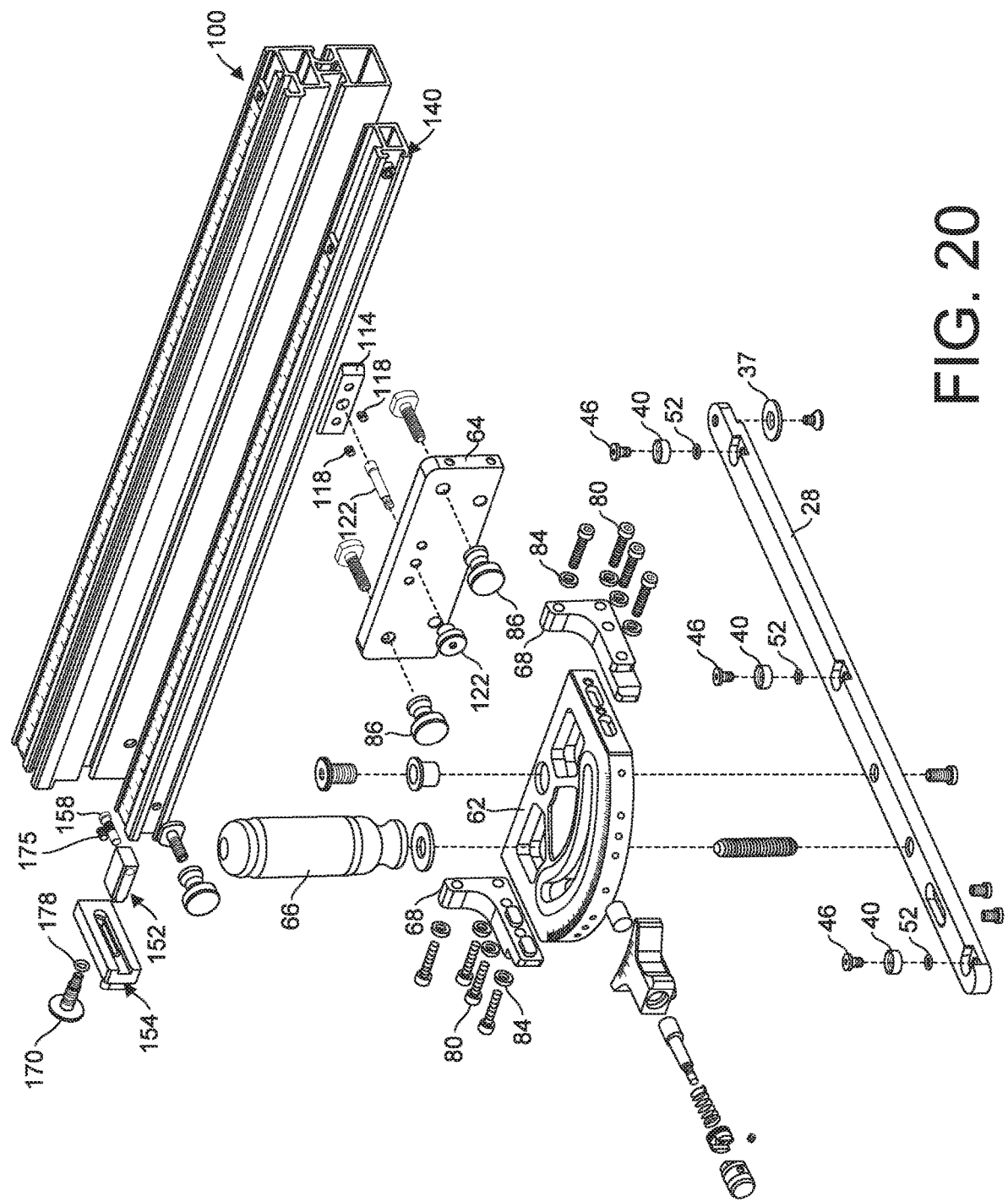
FIG. 20 is an exploded perspective of the miter gauge assembly.

Referring to FIG. 19, the groove 176 has opposite enlarged end portions 176A at each end of the slot 166 that receive the O-ring 178 in the extended and retracted positions. The enlarged end portions 176A are generally arcuate or circular in shape. The groove 176 has a height H along the length of the groove between the opposite enlarged end portions 176A. Each enlarged end portion 176A of the groove 176 has a diameter D that is greater than the height H. The diameter D of each enlarged end portion 176A is generally the same as the exterior diameter of the O-ring 178. Accordingly, the diameter of the O-ring 178 is smaller than the height H of the groove 176. The O-ring 178 is resiliently deformable. The O-ring 178 may be made of rubber or any other suitable material. As explained in more detail below, each enlarged end portion 186A receives the O-ring 178 when the sliding member 154 is in either the extended or retracted position to inhibit the sliding member from moving from either the extended or retracted position. Preferably, the fastener 170 also defines a groove or channel 180 (FIG. 18) that extends circumferentially around the shaft 182 that is configured to receive a portion of the O-ring 178 as well.

The sliding member 154 is selectively movable by the operator between the extending and retracted positions depending on whether or not the operator desires the stock to engage the sliding member. When the sliding member 154 is in the extending and retracted positions, the O-ring 178 mounted on the fastener 170 is received in (e.g., inserted into) one of the enlarged end portions 176A of the groove 176 at either end of the slot 166. In these positions, the O-ring 178 substantially fills the enlarged end portion 176. Consequently, the O-ring 178 has a dimension that is larger than the height H of the groove 176. As a result, any movement of the sliding member 154 from the extended and retracted positions is inhibited by the engagement of the O-ring 178 and the portion of the sliding member defining the portion of the groove 176 having the height H (e.g., every part of the groove except for the enlarged end portions 176A). In other words, the enlarged end portions 176A act as detents or catches that receive the O-ring 178 to inhibit the sliding member 154 from moving. To move the sliding member 154 between the extended and retracted positions, the operator grasps the finger tab 168 and applies a sufficient amount of force to deform (e.g., compress), via the sliding member 154, the O-ring 178 to reduce the heightwise dimension of the O-ring to the height H of the groove 176 (or less) to enable the sliding member to move along the longitudinal axis LA3. Once the sliding member 154 is moved into either the extended or retracted position, the O-ring 178 returns to its original shape (FIG. 19), substantially filling the enlarged end portion 176 and inhibiting movement of the sliding member. In the illustrated embodiment, the mounting block 152 also includes a projection 184 that extends into the slot 166 and/or channel 164 of the sliding member 154 depending upon the position of the sliding member relative to the mounting block. The engagement between the projection 184 and the sliding member 154 guides the movement of the sliding member along the longitudinal axis LA3 and prevents the sliding member from rotating about the fastener 170.

Referring to FIGS. 2 and 11-14, the miter gauge assembly 10 includes a flip stop 200 mounted on the fence assembly 22. The flip stop 200 is configured to engage the stock. In operation, the flip stop 200 can engage the end or side of the stock to set the location of the stock relative to the fence assembly 22. For example, in one embodiment, the flip stop 200 can be used in combination with the scale 106 to establish the dimension the stock is to be cut to. It is understood the flip stop 200 can be used with other fences and fence assemblies. For example, the flip stop 200 can be used with router table fences and fence assemblies.

The flip stop 200 includes a mounting assembly 202 configured to be movably mounted to the fence assembly 22 (broadly, a tool). The fence 100 of the fence assembly 22 includes a t-slot 128, similar to t-slot 104, at the top of the fence to allow accessories, such as the flip stop 200, to be attached to the fence. The mounting assembly 202 is selectively positionable on the fence assembly 22 along the t-slot 128. The mounting assembly includes a base 204 configured to slide along and engage the fence 100. The base 204 defines an opening that receives a threaded rod 209 connected to a clamp nut 208 that is positioned in the t-slot 128. A knob 206 is threadably secured to the threaded rod 209. The knob 206 can be manually rotated for selectively loosening and tightening the clamp nut 208. Rotating the knob 206 to loosen the clamp nut 208 allows the flip stop 200 to move or slide along the fence 100. Rotating the knob 206 to tighten the clamp nut 208 secures or fixes the flip stop 200 on the fence 100. The mounting assembly 202 includes a threaded shaft 210 extending outward from the body 204. The shaft 210 may be fully threaded or only partially threaded. When attached to the fence 100, the threaded shaft 210 is generally parallel to the longitudinal axis LA2 of the fence.

The flip stop 200 also includes a first member 212 operatively connected to the mounting assembly 202. The first member is operatively connected to the mounting assembly and projects outwardly from the mounting assembly. The first member 212 defines an opening 211 that receives the shaft 210. The opening is adjacent an end of the first member 212. A nut 214, such as a self-locking nut, and washer 216 are threaded onto the shaft 210 to secure the first member 212 thereon. The opening 211 that receives the shaft 210 is smooth (e.g., non-threaded). This allows the first member 212 to pivot on the shaft 210. The first member 212 has a longitudinal axis LA4. The first member 212 defines a channel 218 extending from one end of the first member toward the opening that receives the shaft 210. The channel 218 is generally perpendicular to the opening that receives the shaft 210. The channel 218 extends along the lower side of the first member 212. The first member defines a slot 220 in communication with the channel 218. In the illustrated embodiment, the slot 220 is in communication with the base of the channel 218. The slot 220 extends along the first member. The slot 220 is generally parallel to the channel 218 and is centrally disposed above the channel. The slot 220 has closed ends.

The flip stop 200 further includes a second member 222 movably connected to the first member 212. The second member 222 is configured to engage the stock to locate the stock with respect to the fence assembly 22. The second member 222 projects from the first member 212. The second member 222 has a longitudinal axis LA5. The second member 222 is mounted on the first member for movement along the length of the first member and is selectively fixed to the first member to adjust a distance between the second member and the mounting assembly 202. At least a portion of the second member 222 is movably disposed in the channel 218 of the first member 212. The second member 222 has an L-shape with first and second legs 224 and 226, respectively. The first leg 224 is sized and shaped to be received and slide in the channel 218 of the first member. The first leg 224 defines at least one threaded fastener opening 225 configured to align with the slot 220 of the first member. Each threaded fastener opening 225 threadably receives a fastener 228. Each fastener 228 extends through the slot 220 and into a corresponding threaded fastener opening 225 of the first leg 224. The fasteners 228 (broadly, at least one fastener) secure the second member 222 to the first member 212. Washers 230 may also be used with the fasteners 228. The second leg 226 extends from the first leg 224 to a free end and is a generally rectangular shaped bar. The second leg 226 is configured to engage and extend along the guide face 105 of the fence 100 toward the work surface 14. The second leg 226 is configured to engage the stock. In operation, the end or side of the stock butt against the second leg 226. Thus, the second leg 226 prevents the stock from moving along the fence assembly 22 in a direction away from the blade 16.

The second member 222 is movably mounted to the first member 212 by the fasteners 228 that extend through the slot 220 so that the second member is selectively positionable on the first member. As mentioned above, the first leg 224 of the second member 222 can slide within the channel 218 of the first member. By moving the second member 222 within the channel 218 of the first member 212, the distance between the second member and the mounting assembly can be adjusted. Specifically, the distance between the second leg 226 of the second member 222 and the shaft 210 of the mounting assembly can be adjusted. This allows the flip stop 200 to be adjusted to fit fences of different depths, fences with different locations of the t-slot 128 the flip stop is attached to, and fences that include a sub-fence. For example, in one embodiment illustrated in FIG. 13, the second member 222 is disposed adjacent to one end of the channel 218 in order to engage the guide face 105 of the fence 100. In another embodiment illustrated in FIG. 14, the second member 22 is disposed adjacent to the opposite end of the channel 218 in order accommodate the additional depth added by a sub-fence 300 attached to the fence 100. In this embodiment, the second member 222 engages the guide face 305 of the sub-fence 300. Sub-fences are generally known in the art and, thus, a detailed description is omitted here. It is understood that the second member 222 can be selectively positioned at any point along the channel 218 of the first member 212. The fasteners 228 can be rotated with a tool, such a screw driver, for selectively loosening and tightening the second member 222 on the first member 212. Loosening the fasteners 228 allows the second member 222 to move or slide in the channel 218 of the first member 212 and allows the fasteners to move or slide in the slot 220. Tightening the fasteners 228 secures or fixes the second member 222 in position on the first member 212.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A stop for a tool that engages a work piece on a work platform, the stop comprising:
   a mounting assembly configured to be movably mounted on the tool so that the mounting assembly is selectively positionable on the tool;
   a first member operatively connected to the mounting assembly and rotatable about an axis of rotation, the first member projecting in a first direction from the axis of rotation to an end of the first member, the first direction being generally orthogonal to the axis of rotation, the first member having a first longitudinal axis parallel to the first direction; and
   a second member projecting along a second longitudinal axis in a second direction from the first member to an end of the second member, the second longitudinal axis intersecting the first member and the second member, the second direction being generally orthogonal to the first direction and to the axis of rotation, the end of the second member being a free end, the second member configured to engage the work piece to locate the work piece with respect to the tool, the second member being mounted to the first member for movement along the first longitudinal axis of the first member and selectively fixable to the first member to adjust a distance between the second member and a reference plane, the axis of rotation lying in the reference plane and the reference plane being parallel to the second direction, the distance being parallel to the first longitudinal axis of the first member, the first longitudinal axis of the first member and the second longitudinal axis of the second member are at a fixed, non-adjustable angular orientation relative to one another.

2. The stop as set forth in claim 1, further comprising a fastener and wherein the first member comprises a slot receiving the fastener for connecting the second member to the first member.

3. The stop as set forth in claim 1, wherein the first member is rotatably mounted on the mounting assembly.

4. The stop as set forth in claim 3, wherein the mounting assembly includes a shaft, the first member being rotatably mounted on the shaft.

5. The stop as set forth in claim 4, wherein the mounting assembly includes a clamp nut configured to secure the mounting assembly on the tool.

6. The stop as set forth in claim 1, wherein the second member is slidably mounted on the first member for movement along the first longitudinal axis of the first member.

7. The stop as set forth in claim 6, wherein the first member defines a channel extending along the first longitudinal axis of the first member, the second member being slidably disposed in the channel.

8. The stop as set forth in claim 7, wherein the second member includes a first leg and a second leg extending from the first leg, the first leg slidably disposed in the channel of the first member.

9. The stop as set forth in claim 8, wherein the first member defines a slot in communication with the channel.

10. The stop as set forth in claim 9, wherein the slot extends along the first longitudinal axis of the first member.

11. The stop as set forth in claim 10, further comprising at least one fastener connecting the first member to the second member, the at least one fastener extending through the slot and into the channel of the first member.

12. The stop as set forth in claim 11, wherein the at least one fastener is threadably connected to the first leg of the second member.

13. The stop as set forth in claim 12, wherein the at least one fastener comprises two fasteners.

14. The stop as set forth in claim 12, wherein the first and second legs are arranged to form a generally L-shape.

15. A tool assembly comprising the stop of claim 1 and the tool referenced in claim 1.

16. The tool assembly as set forth in claim 15, wherein the tool includes a fence having a guide face configured to engage and guide the work piece, wherein the second member is configured to be selectively fixed to the first member in a first location such that the second member engages the guide face.

17. The tool assembly as set forth in claim 16, wherein the tool includes a sub-fence coupled to the fence, the sub-fence having a sub-fence guide face configured to engage and guide the work piece, wherein the second member is configured to be selectively fixed to the first member in a second location such that the second member engages the sub-fence guide face.

18. The stop as set forth in claim 1, wherein the end of the second member is a second end, the second member including a first end at the first member that is opposite the second end, the second direction extending from the first end toward the second end.

19. The stop as set forth in claim 1, wherein the end of the second member is the portion of the second member farthest from the first member.

20. The stop as set forth in claim 1, wherein the first member has a first member distance measured between the axis of rotation and the end of the first member, the first member distance being non-adjustable.

21. The stop as set forth in claim 1, wherein the reference plane is a first reference plane, wherein the mounting assembly includes a lower surface arranged to engage the tool when the mounting assembly is movably mounted on the tool, the lower surface lying in a second reference plane, the end of the second member is spaced apart from the second reference plane in the second direction when the first and second members are rotated relative to the mounting assembly about the axis of rotation to a position where the first and second reference planes are perpendicular to one another and the lower surface faces in the second direction.

22. The stop as set forth in claim 1, wherein the mounting assembly and the first member are arranged relative to one another to permit the first member to rotate 90 degrees about the axis of rotation in a direction away from the work platform when the mounting assembly is mounted on the tool.

23. A stop for a tool that engages a work piece on a work platform, the stop comprising:
    a mounting assembly configured to be movably mounted on the tool so that the mounting assembly is selectively positionable on the tool, the mounting assembly including a clamp nut configured to secure the mounting assembly on the tool;
    a first member operatively connected to the mounting assembly and rotatable about an axis of rotation, the first member projecting in a first direction from the axis of rotation to an end of the first member, the first direction being generally orthogonal to the axis of rotation, the first member having a first longitudinal axis parallel to the first direction; and
    a second member projecting along a second longitudinal axis in a second direction from the first member to an end of the second member, the second longitudinal axis intersecting the first member and the second member, the second direction being generally orthogonal to the first direction and to the axis of rotation, the second member configured to engage the work piece to locate the work piece with respect to the tool, the second member being mounted to the first member for movement along the first longitudinal axis of the first member and selectively fixable to the first member to adjust a distance between the second member and a reference plane, the axis of rotation lying in the reference plane and the reference plane being parallel to the second direction, the distance being parallel to the first longitudinal axis of the first member, the first longitudinal axis of the first member and the second longitudinal axis of the second member are at a fixed, non-adjustable angular orientation relative to one another.

24. A tool assembly for a work piece on a work platform, the tool assembly comprising:
    a tool including a fence configured to overlie the work platform, the fence having a guide face arranged to engage and guide the work piece when the work piece is on the work platform;

a stop configured to engage the work piece when the work piece is on the work platform and guided along the guide face, the stop comprising:
- a mounting assembly movably mounted on the tool so that the mounting assembly is selectively positionable on the tool;
- a first member operatively connected to the mounting assembly and rotatable about an axis of rotation, the first member projecting in a first direction from the axis of rotation to an end of the first member, the first direction being generally orthogonal to the axis of rotation, the first member having a first longitudinal axis parallel to the first direction; and
- a second member projecting along a second longitudinal axis in a second direction from the first member to an end of the second member, the second longitudinal axis intersecting the first member and the second member, the second direction being generally orthogonal to the first direction and to the axis of rotation, the second member arranged to engage the work piece to locate the work piece with respect to the tool, the second member being mounted to the first member for movement along the first longitudinal axis of the first member and selectively fixable to the first member to adjust a distance between the second member and the guide face when the first and second members are at a first position about the axis of rotation, the axis of rotation being parallel to the guide face, the guide face being parallel to the second direction when the first and second members are at the first position about the axis of rotation, the distance being parallel to the first longitudinal axis of the first member, the first longitudinal axis of the first member and the second longitudinal axis of the second member are at a fixed, non-adjustable angular orientation relative to one another;
- wherein the second member is configured to be selectively fixed to the first member in a first location such that the second member engages the guide face.

25. The tool assembly as set forth in claim 24, wherein the tool includes a sub-fence coupled to the fence, the sub-fence having a sub-fence guide face configured to engage and guide the work piece, wherein the second member is configured to be selectively fixed to the first member in a second location such that the second member engages the sub-fence guide face.

26. The tool assembly as set forth in claim 24, wherein the first and second members are rotatable about the axis of rotation to a second position different from the first position where the guide face is not parallel to the second direction and the second member does not engage the guide face.

* * * * *